US007157826B2

(12) United States Patent
Rajasingham

(10) Patent No.: US 7,157,826 B2
(45) Date of Patent: Jan. 2, 2007

(54) AXIAL GAP ELECTRICAL MACHINE

(76) Inventor: Arjona Indraeswaran Rajasingham, 6024 Bradley Blvd., Bethesda, MD (US) 20817

( * ) Notice: Subject to any disclaimer, the term of this patent is extended or adjusted under 35 U.S.C. 154(b) by 0 days.

(21) Appl. No.: 11/067,277

(22) Filed: Feb. 28, 2005

(65) Prior Publication Data
US 2006/0082239 A1 Apr. 20, 2006

Related U.S. Application Data

(63) Continuation-in-part of application No. 09/971,035, filed on Oct. 5, 2001, now Pat. No. 7,098,566.

(60) Provisional application No. 60/547,426, filed on Feb. 26, 2004, provisional application No. 60/307,148, filed on Jul. 24, 2001, provisional application No. 60/293,388, filed on May 24, 2001, provisional application No. 60/329,715, filed on Oct. 18, 2001.

(51) Int. Cl.
H02K 17/00 (2006.01)

(52) U.S. Cl. .................... 310/208; 310/203; 29/605

(58) Field of Classification Search ................ 310/268, 310/266, 196, 256, 201–208; 29/605, 606
See application file for complete search history.

(56) References Cited

U.S. PATENT DOCUMENTS 4,748,361 A * 5/1988 Ohnishi et al. ......... 310/156.36
5,744,896 A * 4/1998 Kessinger et al. .......... 310/268

* cited by examiner

Primary Examiner—Dang Le

(57) ABSTRACT

An axial gap electrical machine employs unique architecture to (1) overcome critical limits in the air gap at high speeds, while maintaining high torque performance at low speeds, while synergistically providing a geometry that withstands meets critical force concentration within these machines, (2) provides arrangements for cooling said machines using either a Pelletier effect or air fins, (3) "windings" that are produced as ribbon or stampings or laminates, that may be in some cases be arranged to optimize conductor and magnetic core density within the machine. Arrangements are also proposed for mounting the machines as wheels of a vehicle, to provide ease of removing and installing said motor.

9 Claims, 32 Drawing Sheets

Proposed Windings

Proposed Windings
Axial Gap

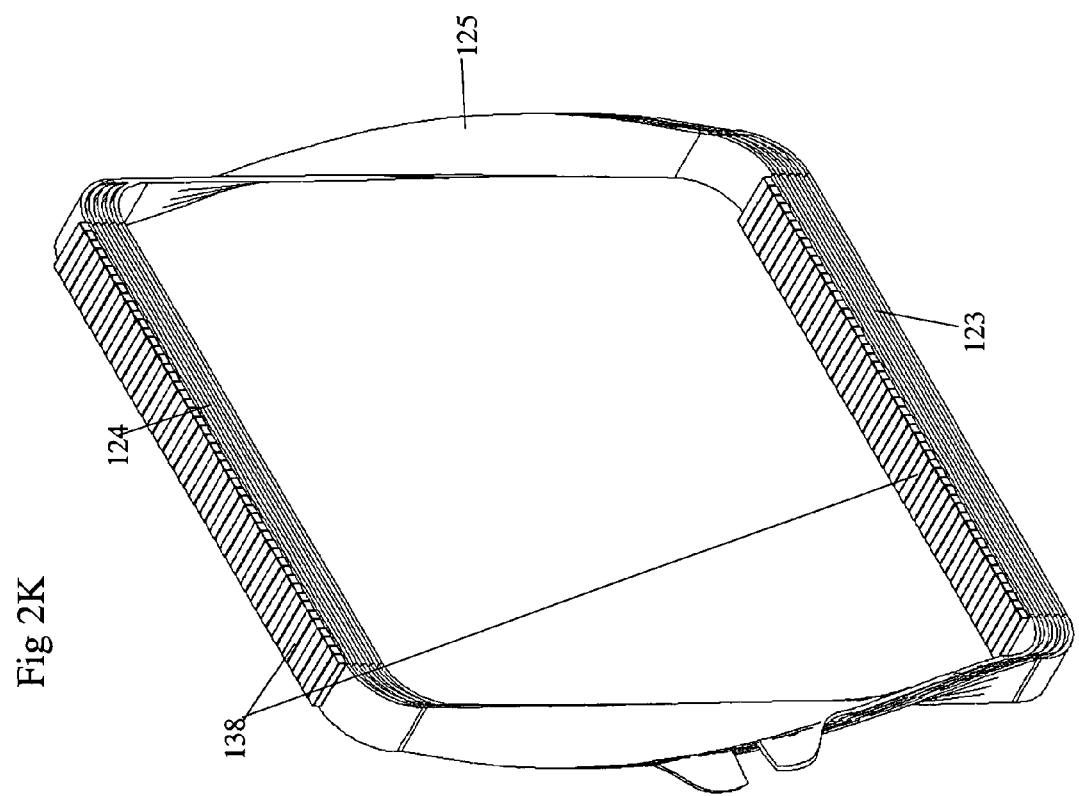

Fig 2K1
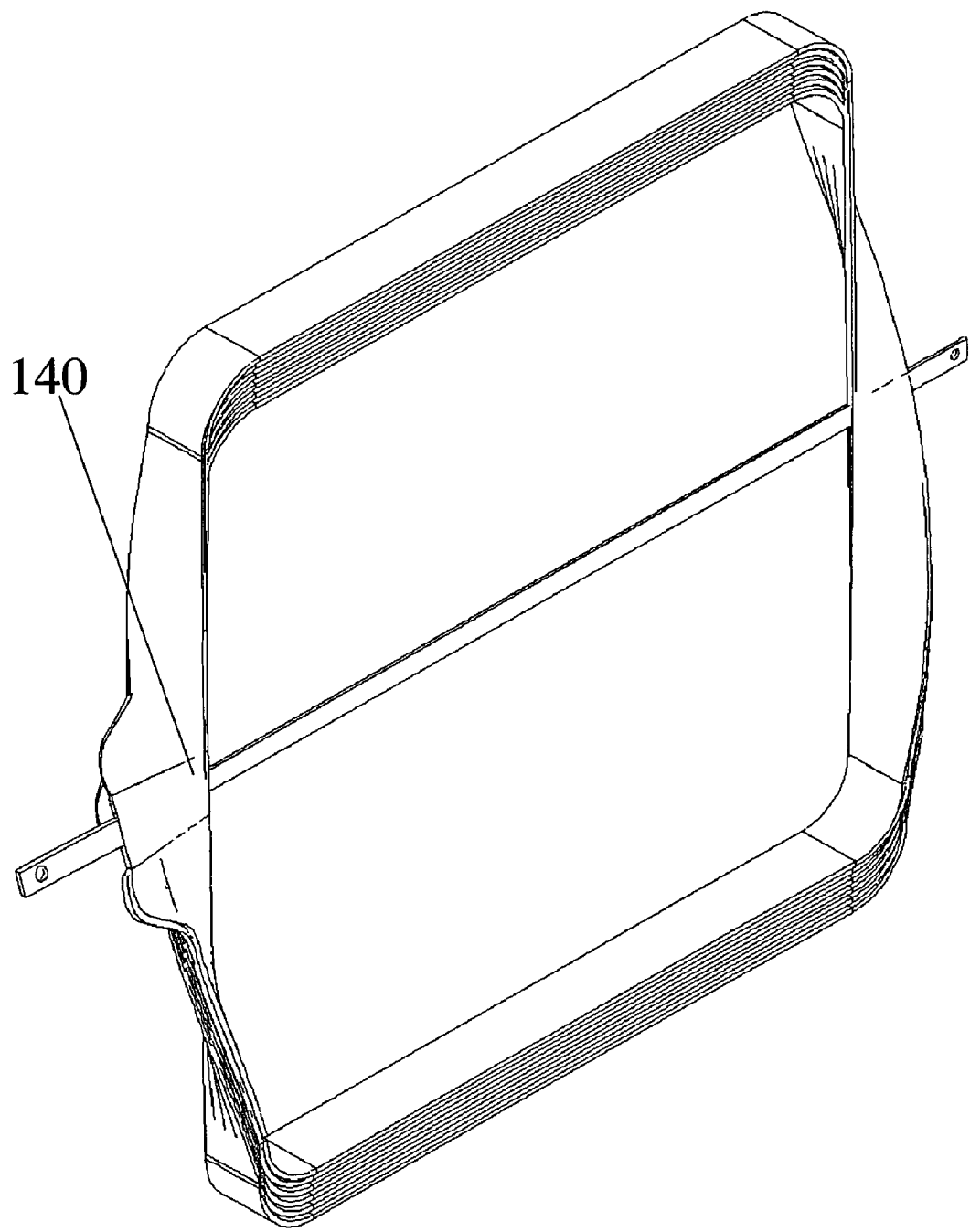

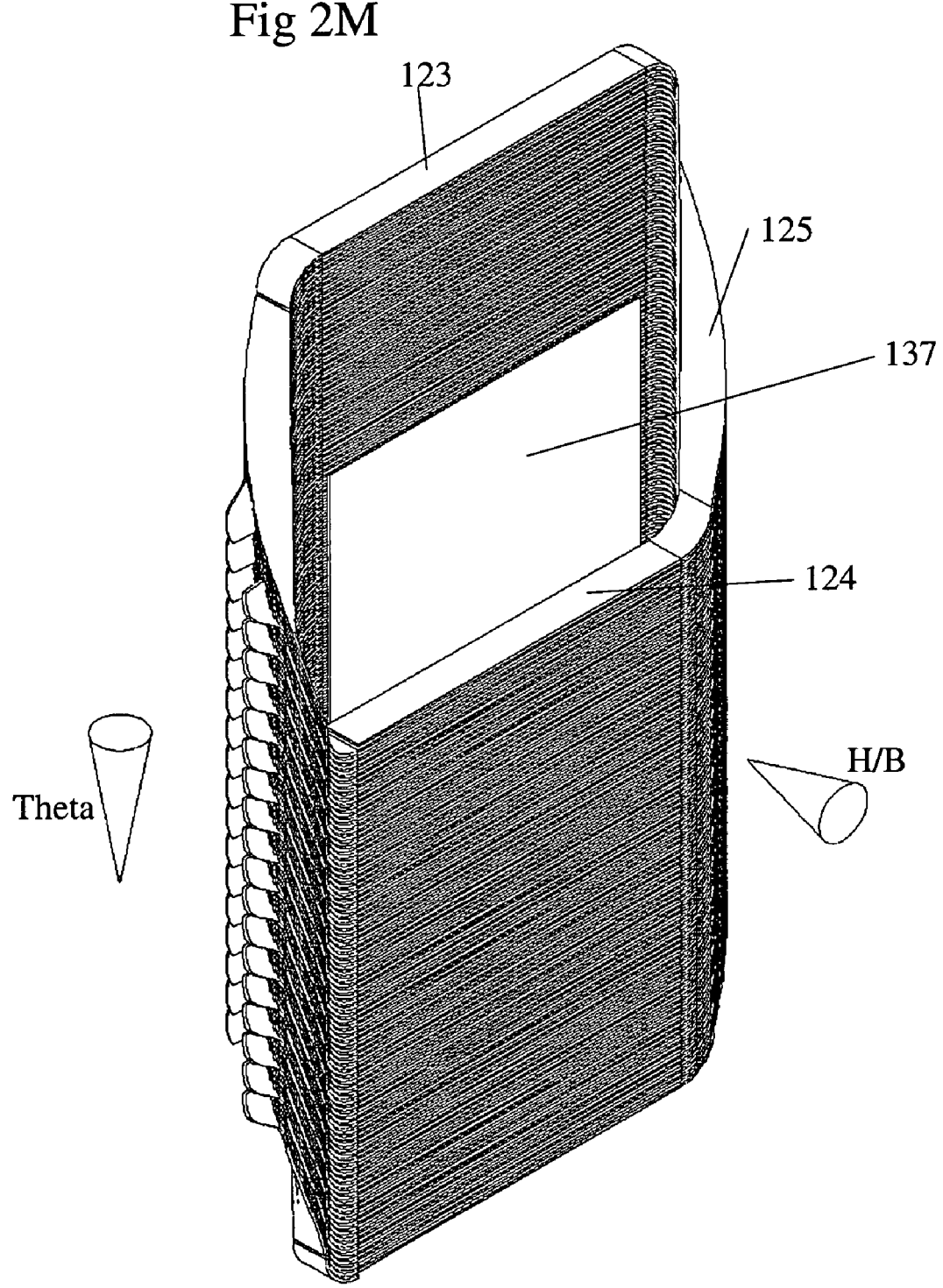

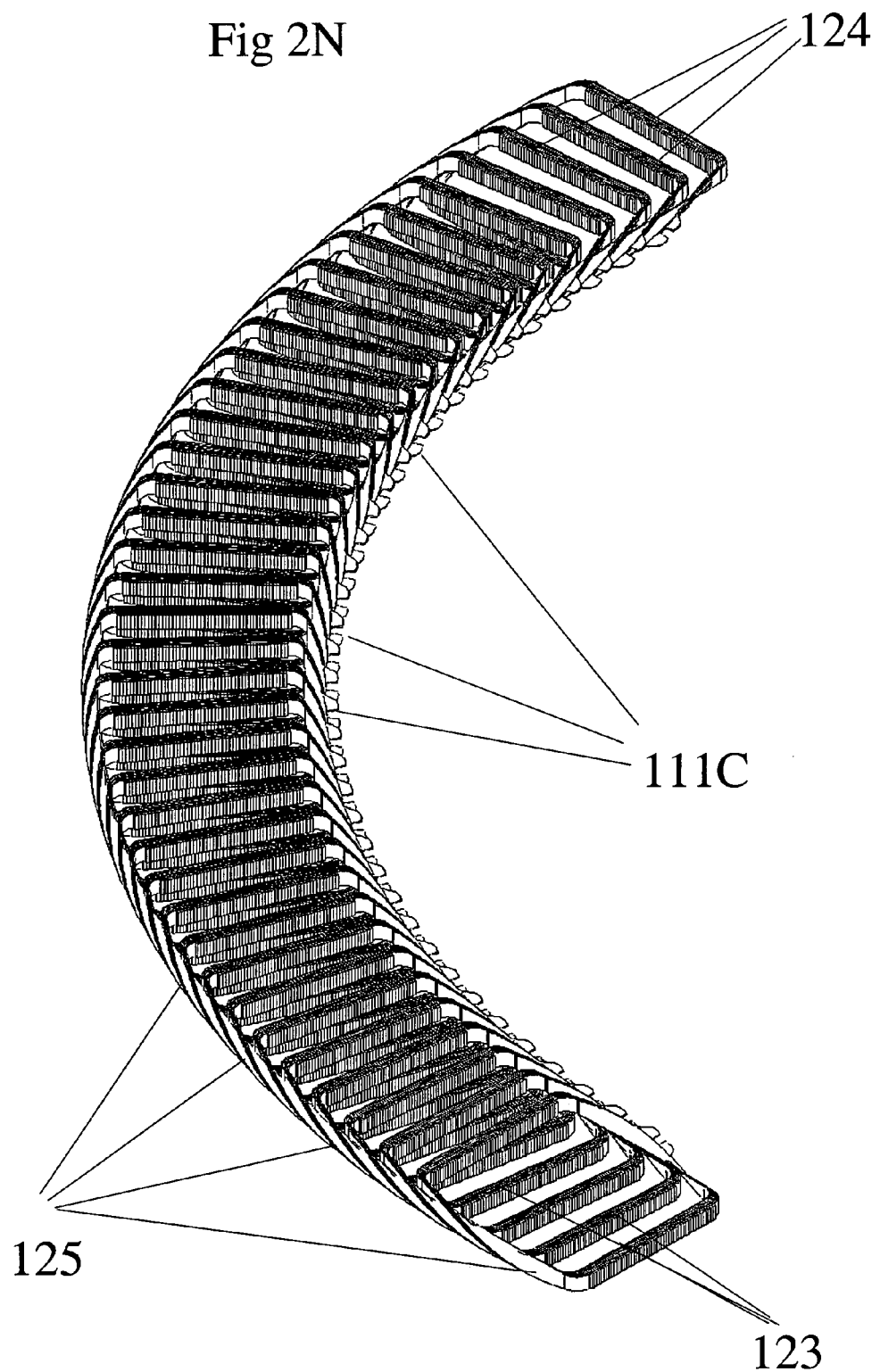

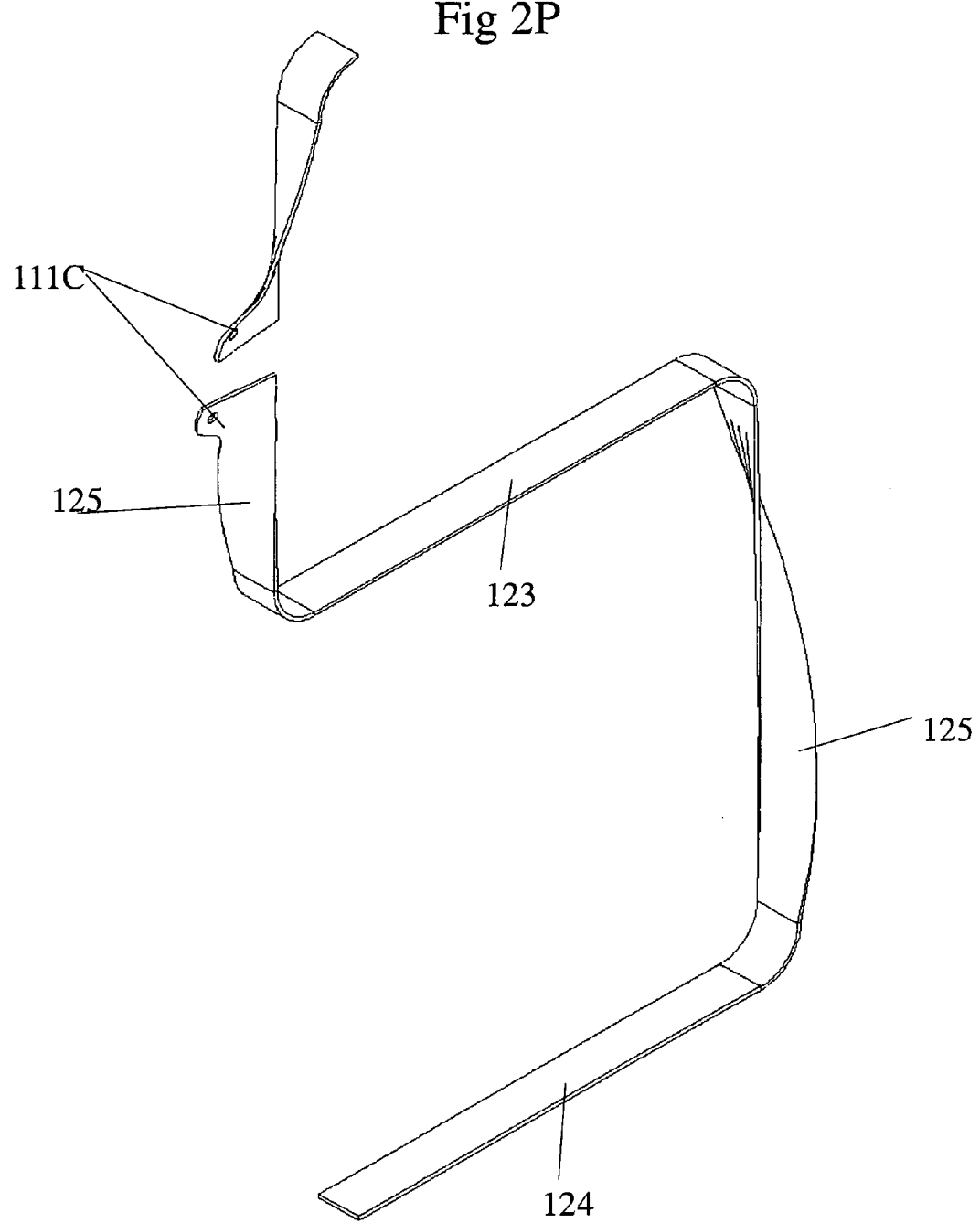

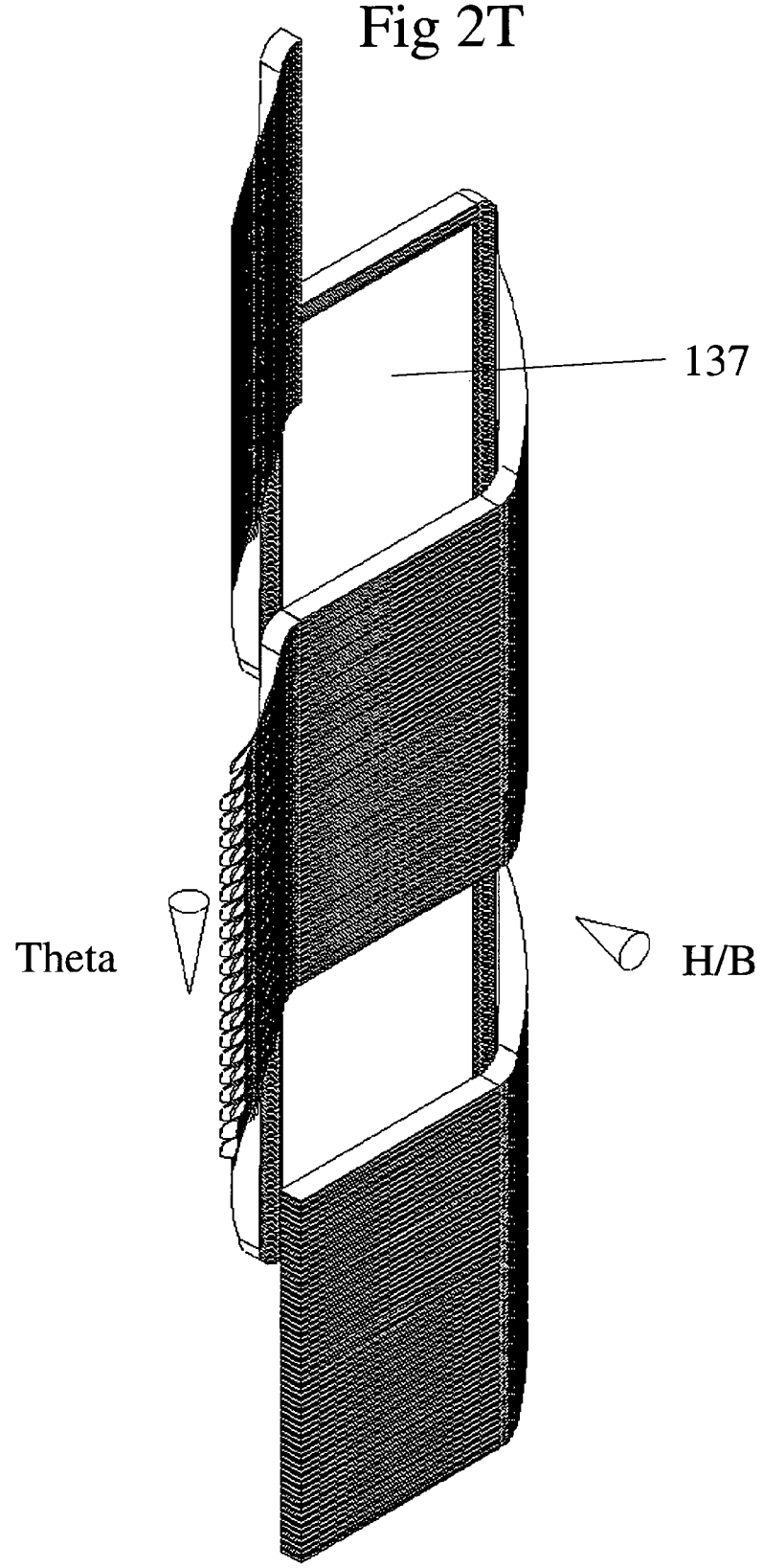

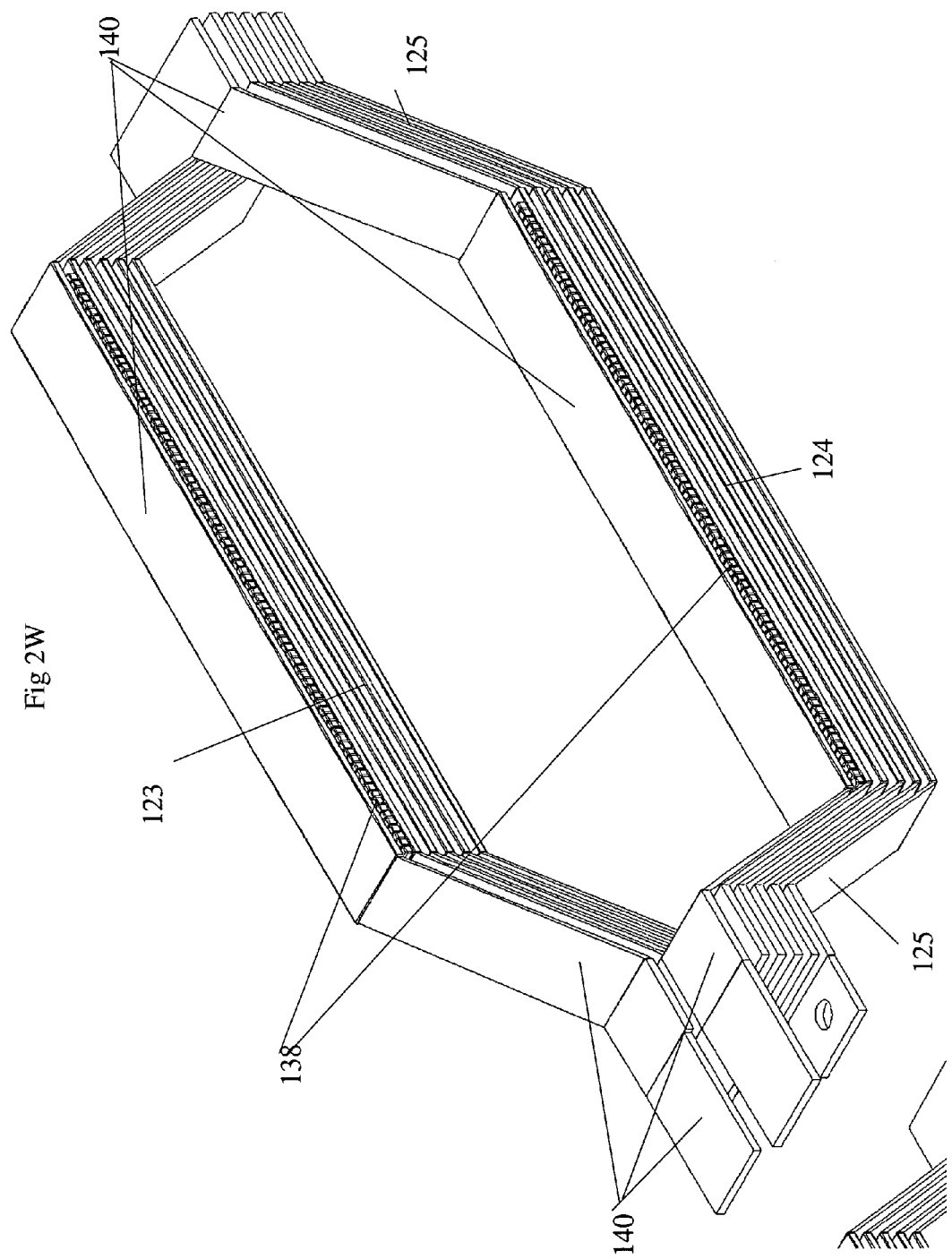

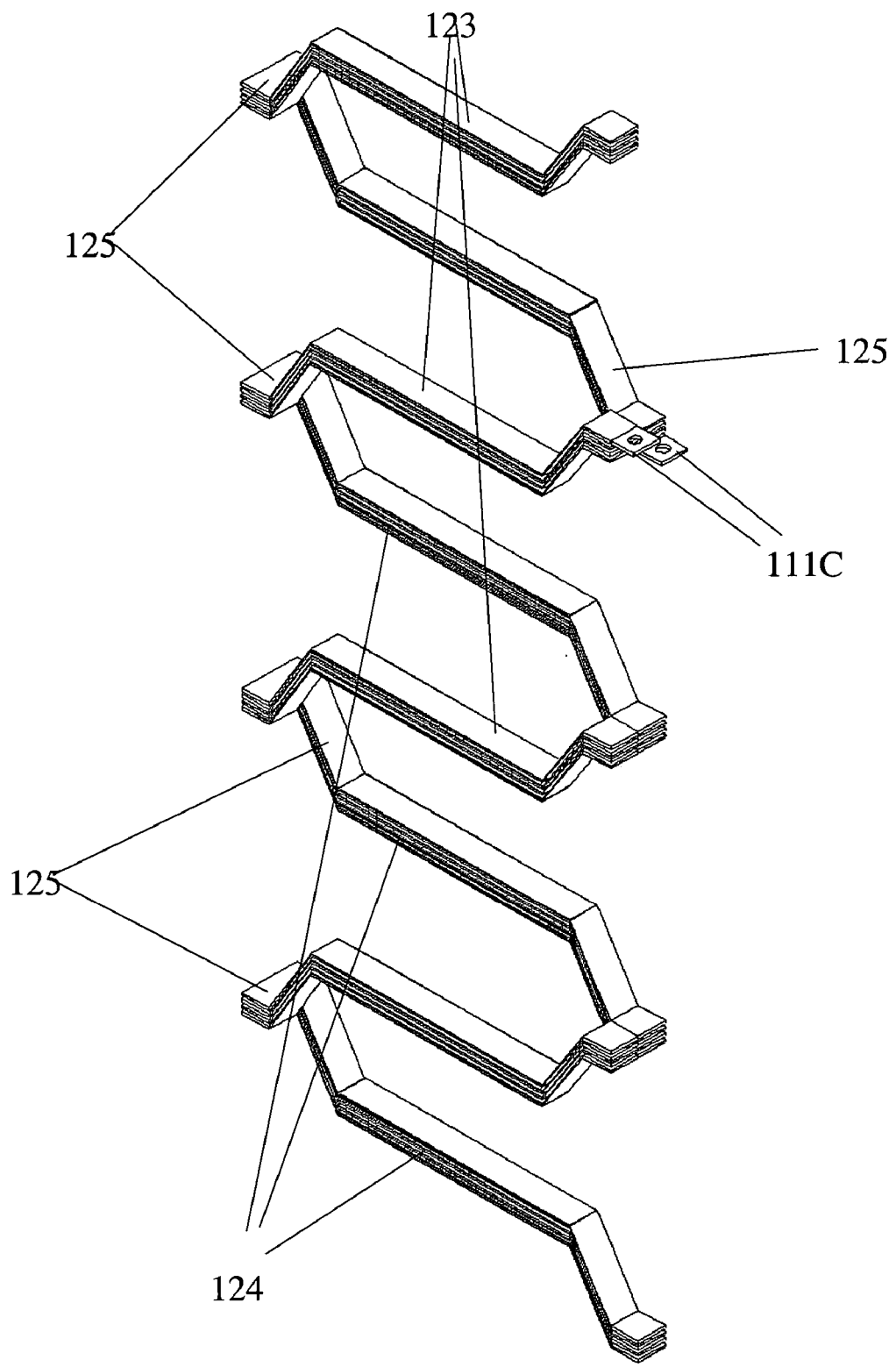

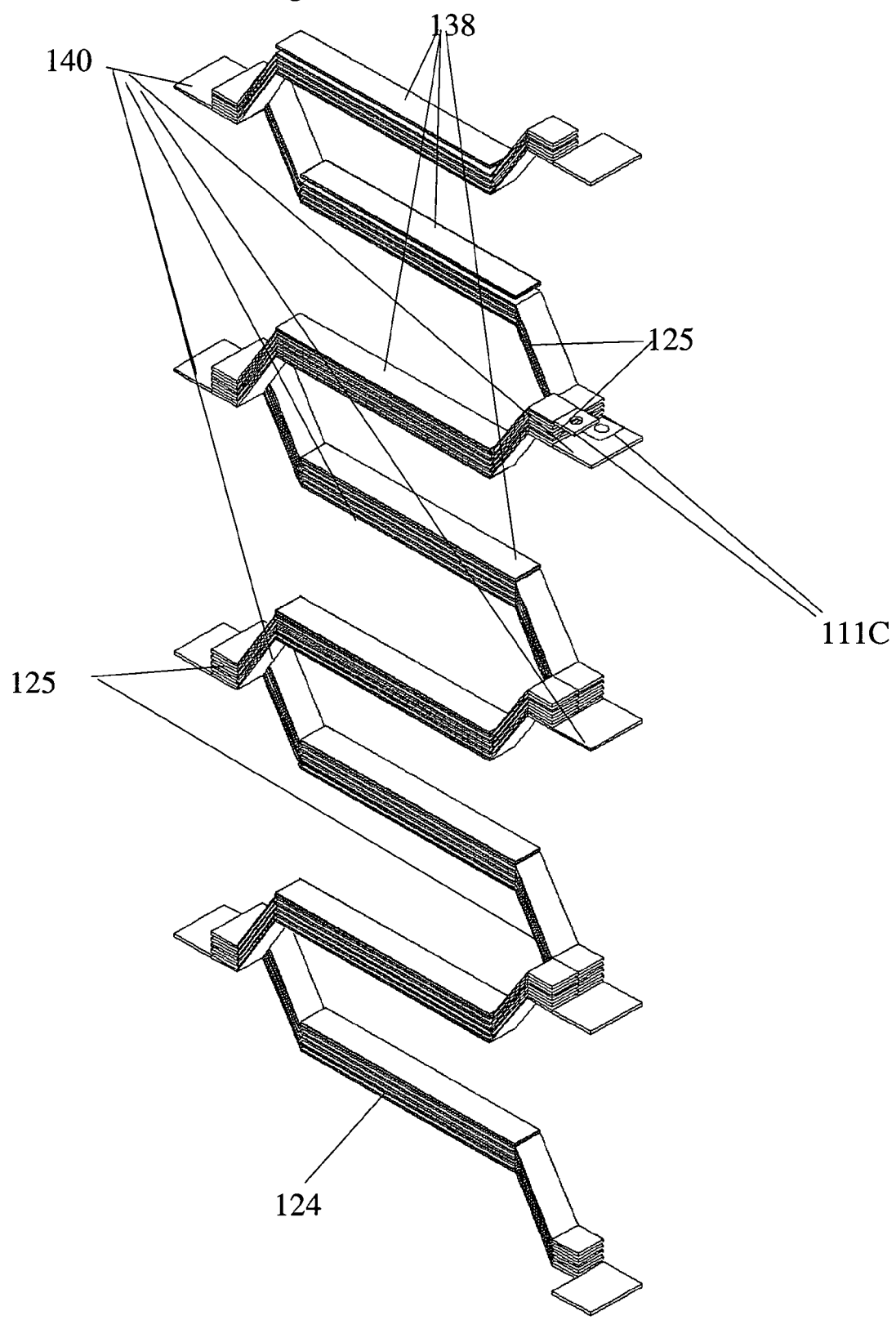

Fig 2Y1
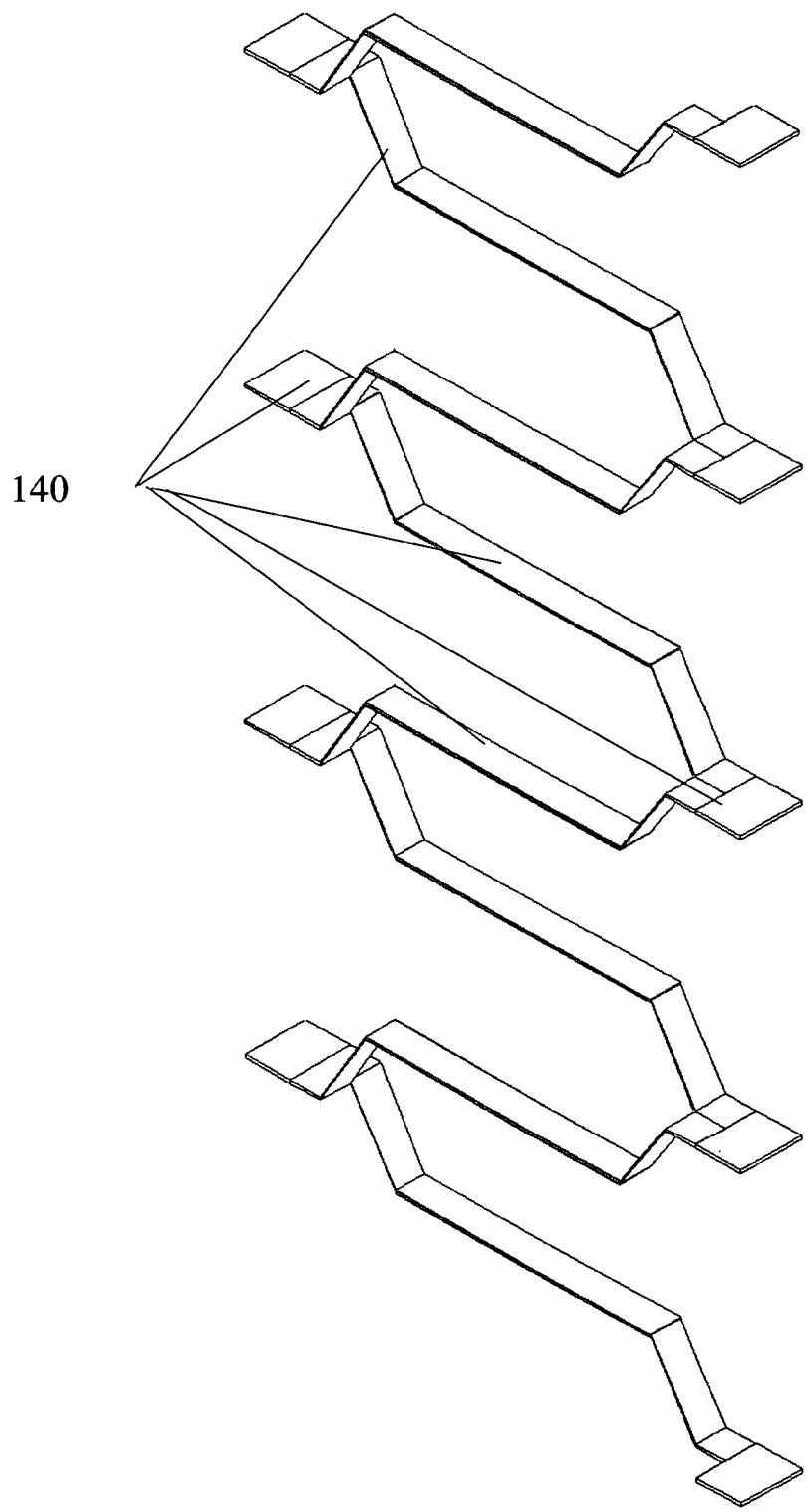

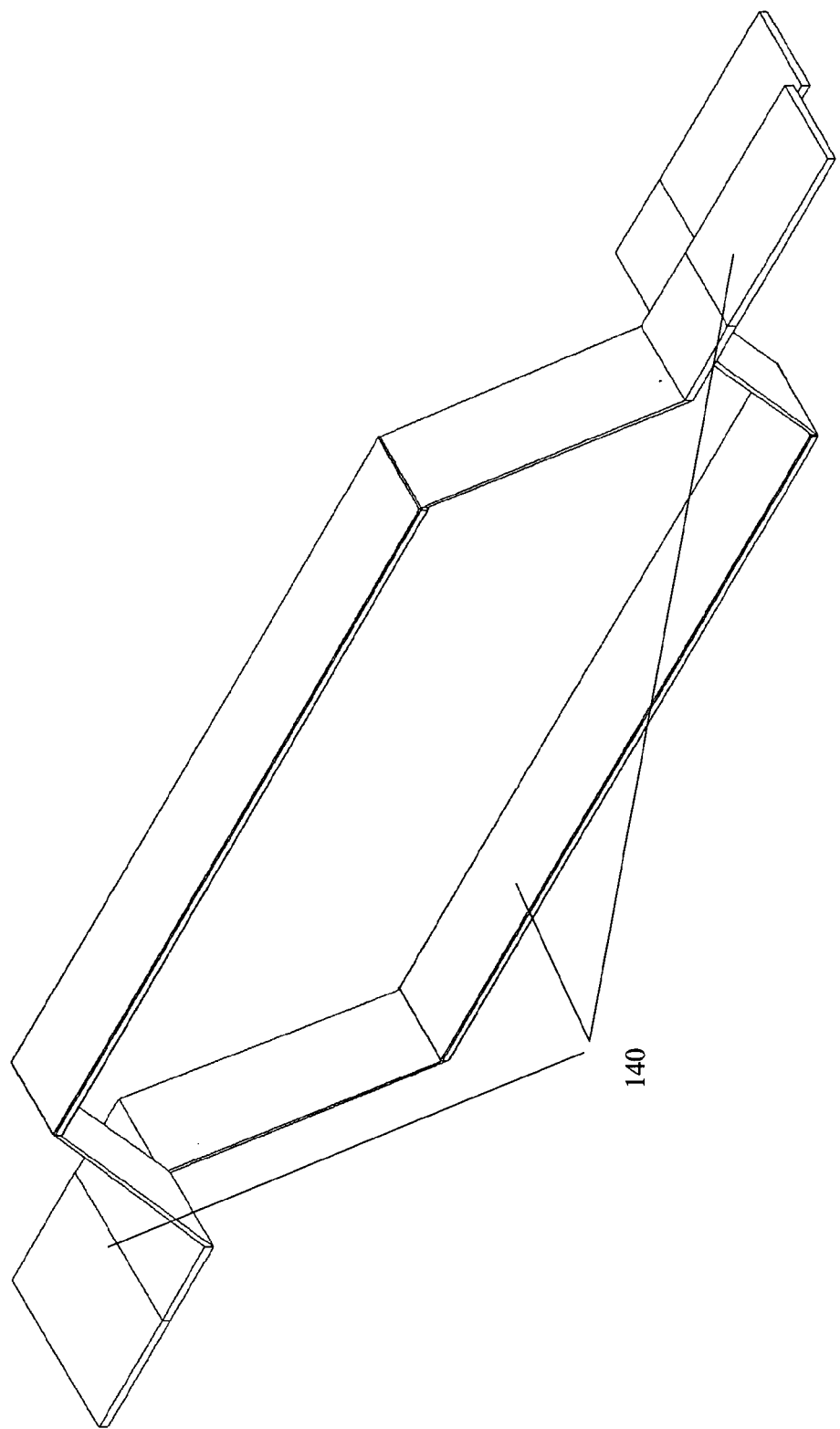
Fig 2Y2

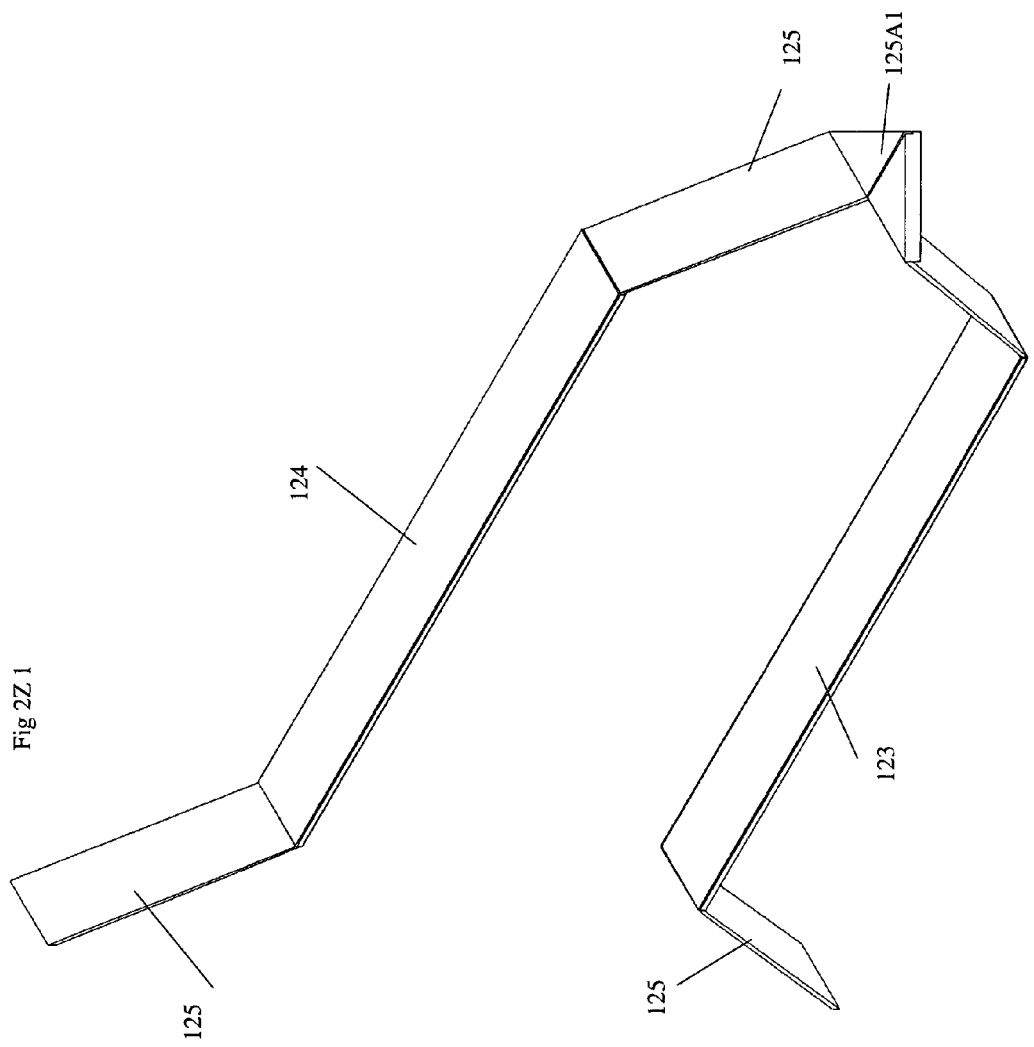

Fig 2Z2
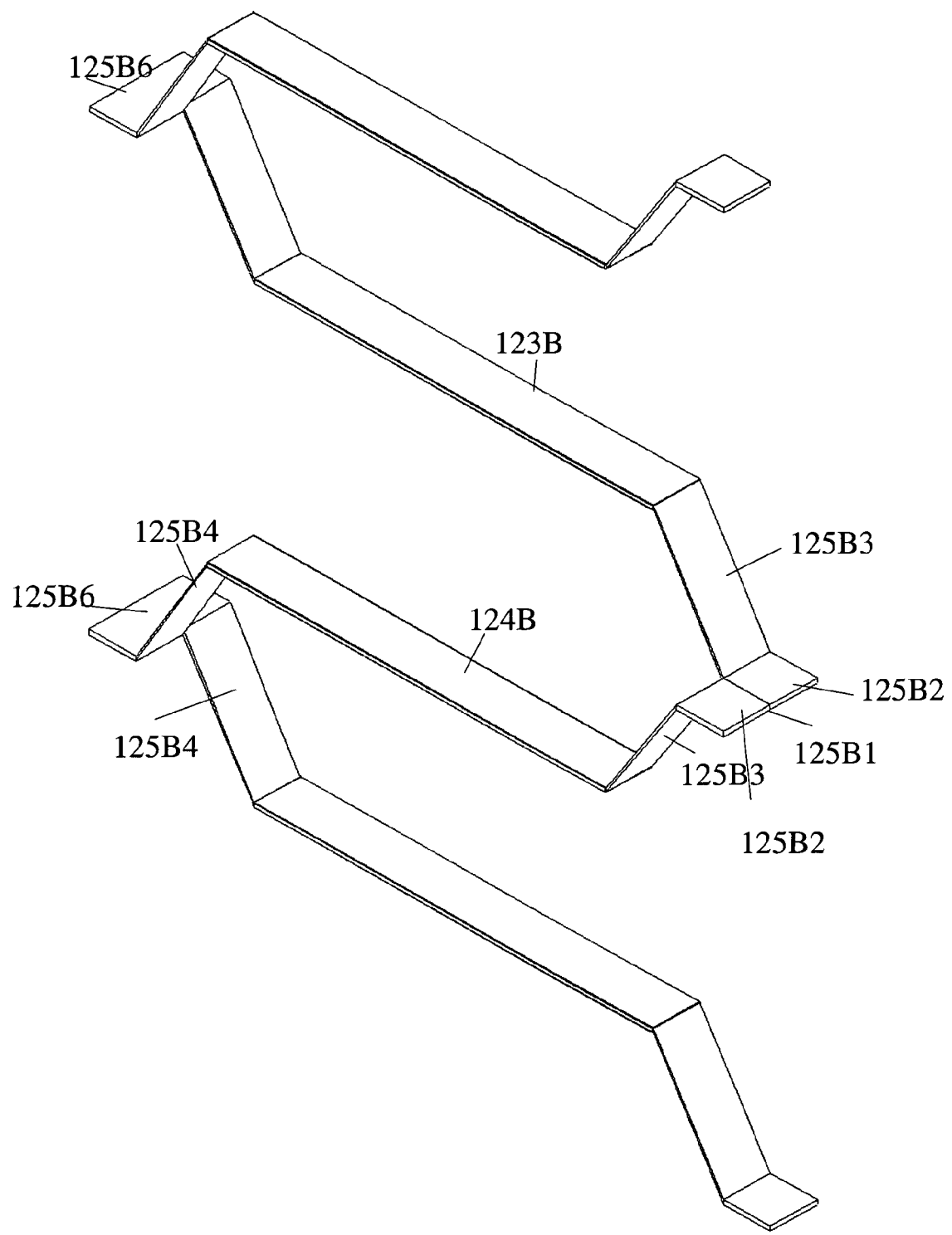

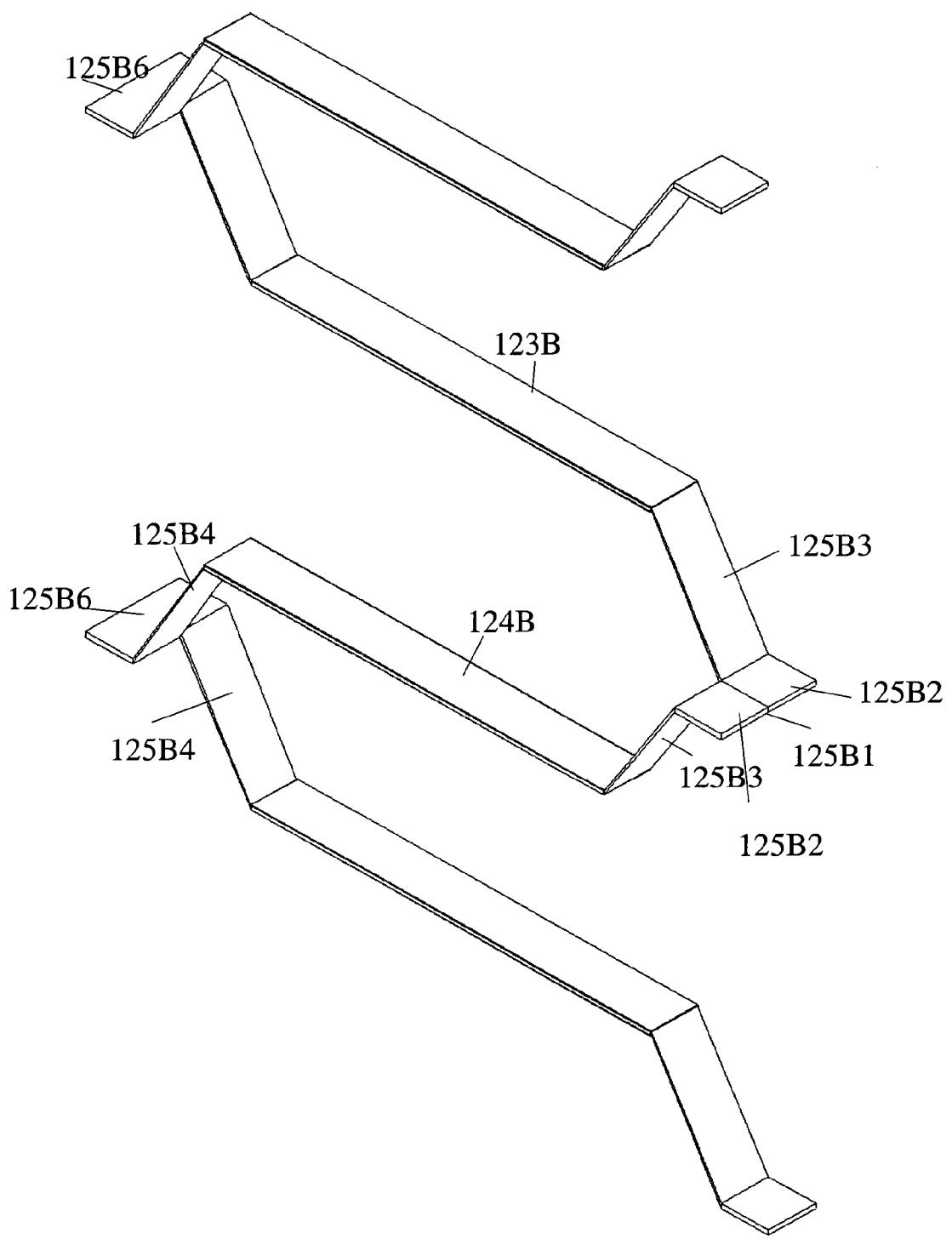
Fig 2Z2A

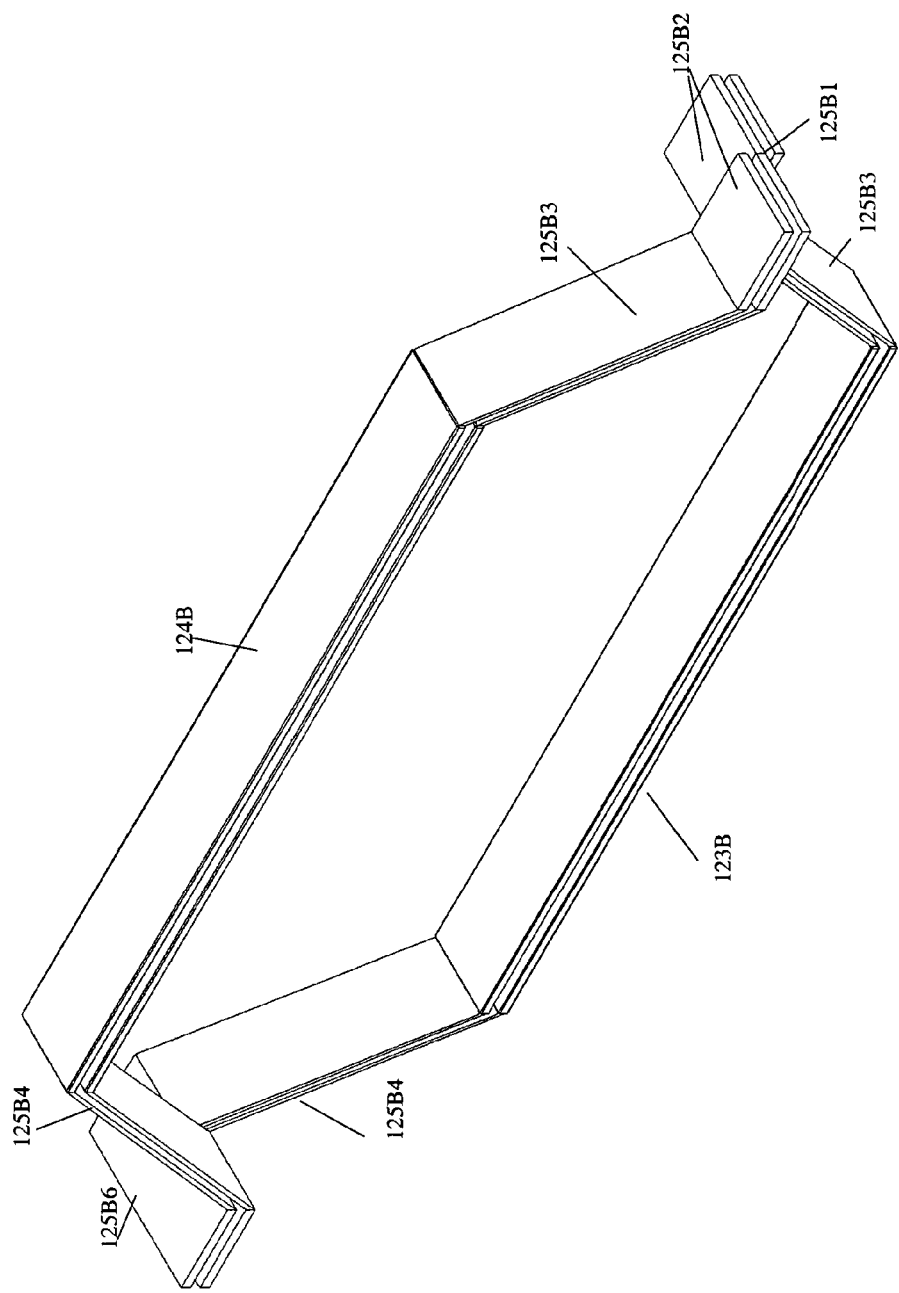

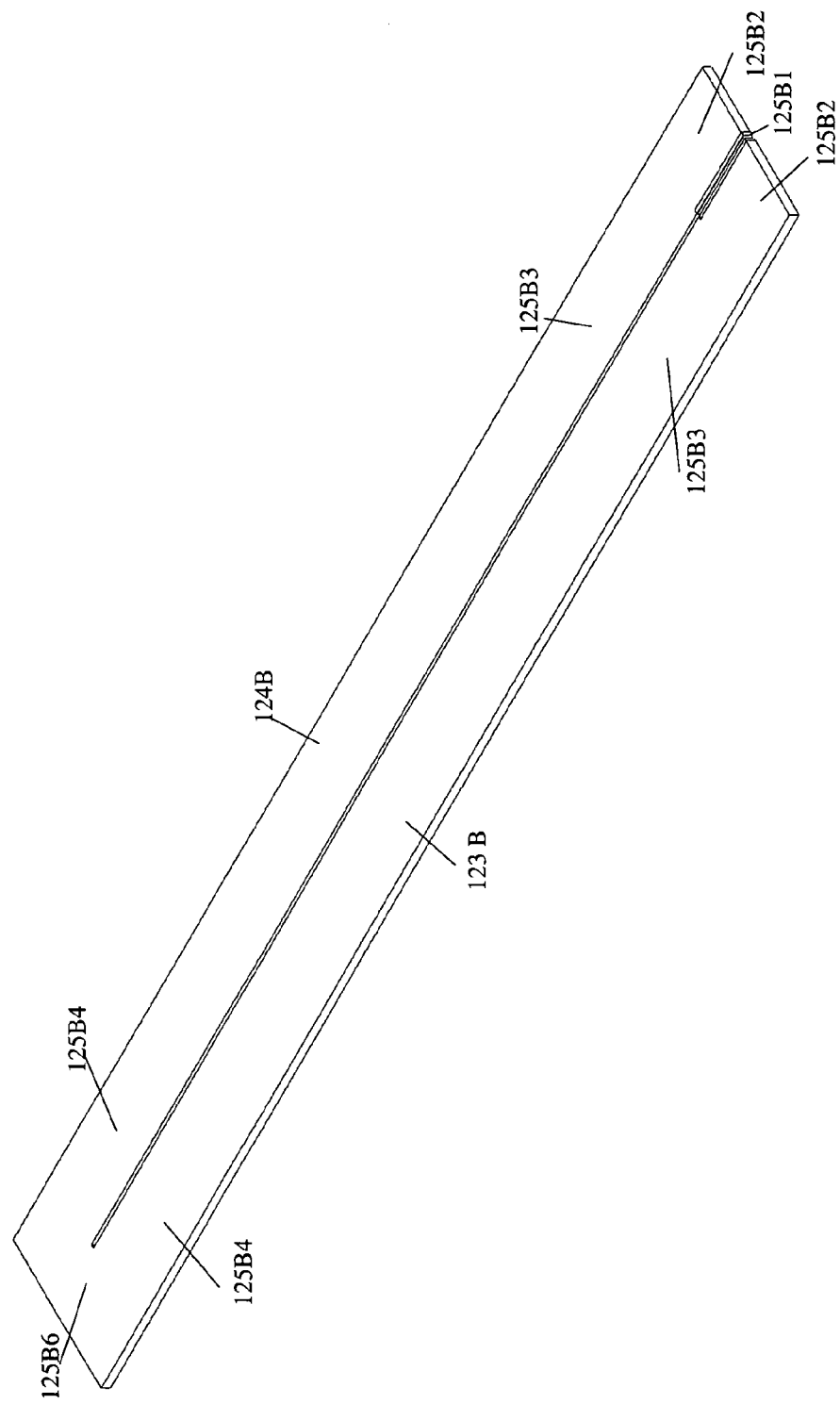
Fig 2Z3

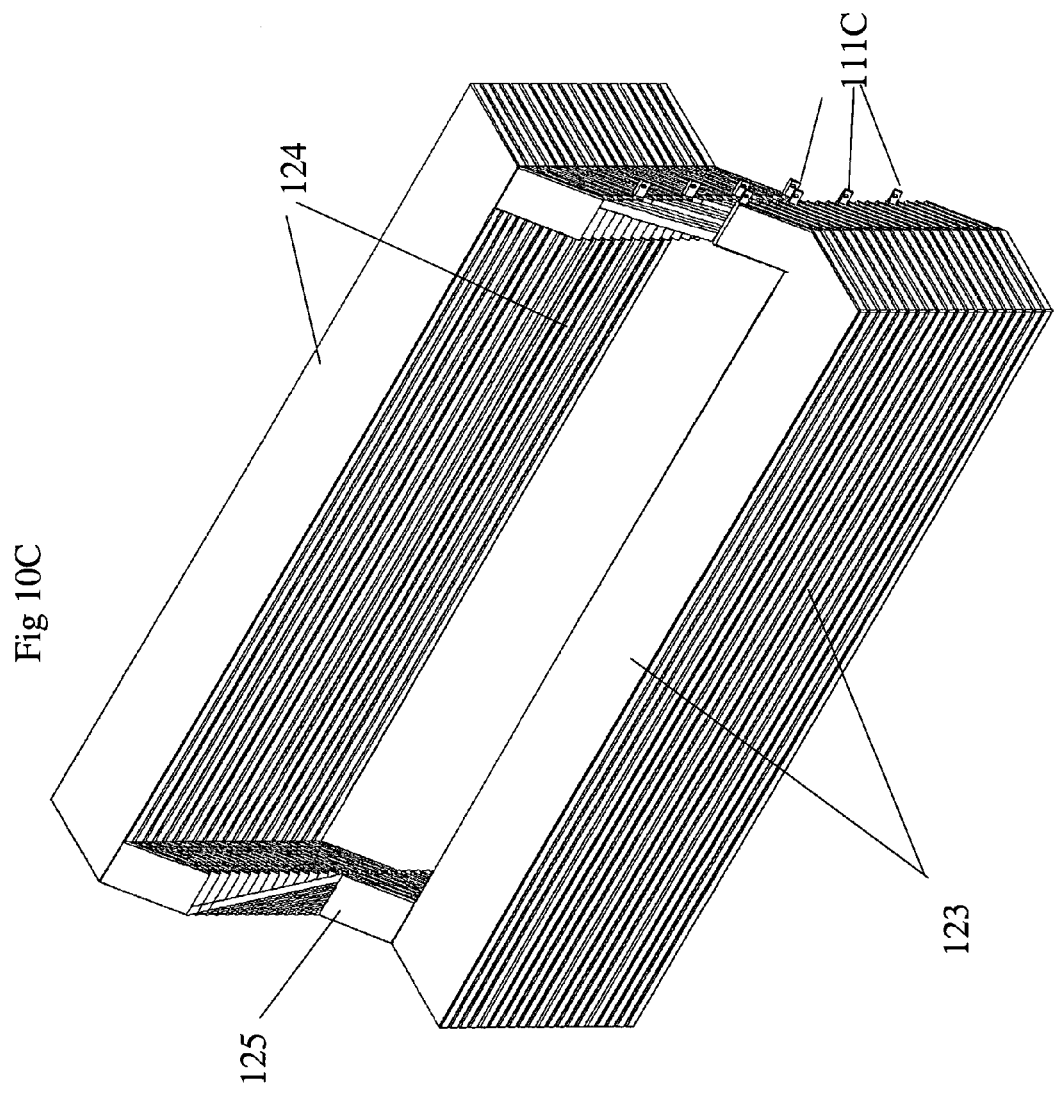

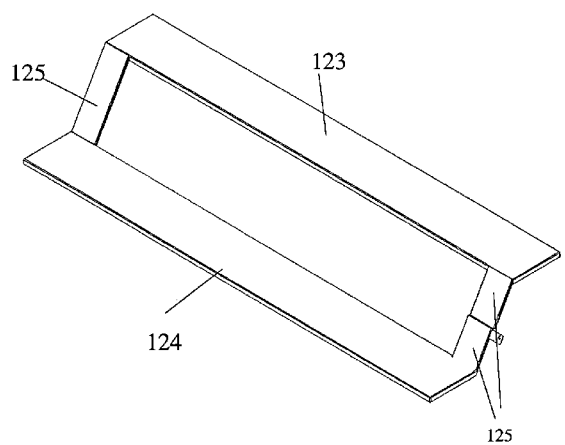
Fig 13 A1
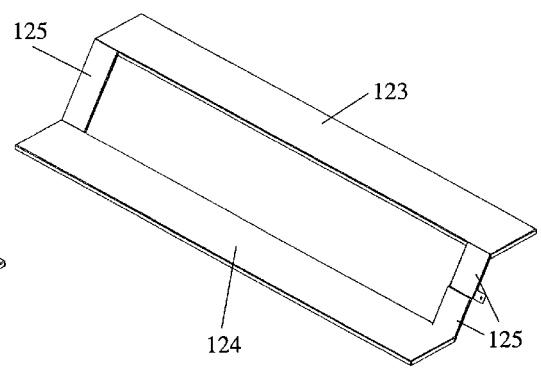
Fig 13 A2

AXIAL GAP ELECTRICAL MACHINE

CROSS REFERENCE TO RELATED APPLICATIONS

This application derives priority from 60/293,388 filed May. 24, 2001; 60/307,148 filed Jul. 24, 2001; 60/329,715, filed Oct. 18, 2001; 09/971,035 filed Oct. 5, 2001 now U.S. Pat. No. 7,098,566 (Continuation-in-part); 60/547,426 filed Feb. 26, 2004.

STATEMENT REGARDING FEDERALLY SPONSORED RESEARCH OR DEVELOPMENT

Not Applicable

REFERENCE TO A MICRO FICHE APPENDIX

Not Applicable

BACKGROUND OF INVENTION

This invention relates to axial gap electrical machines, and more particularly relates to such machines employing Permanent magnets. Axial gap electrical machines have been proposed in the past. The background art has a number of inventions that do not anticipate the present invention for example: Casale U.S. Pat. No. 2,138,292 discloses a winding arrangement that has overlapping windings for a radial gap machine as opposed an axial gap machine. Moreover, while the windings are over lapping the topology of these winding force consecutive working sections of windings in the specified slots to move in opposite directions in contrast to the present invention where the two working conductors and indeed the winding working section move in the same physical direction around consecutive turns. Scott U.S. Pat. No. 5,177,392 discloses an axial gap machine wherein the stator with windings is built on a back iron support element with slots to accommodate the windings—in sharp contrast to the present invention where consecutive windings are interlocking and generate a complete annular ring that is self supporting and may be attached to an axle or housing using standard methods of attachment of annular rings to axles and external housings. A back iron in the present invention is an optional element. Kitson U.S. Pat. No. 3,079,519 discloses a winding arrangement for a radial gap machine wherein the windings are each configured to fit into radial slots. However, in contrast to the present invention the conductors are arranged in the windings to present a wide surface area orthogonal to the direction of the magnetic flux thereby in contrast to the present invention where the orientation of the conductors minimize the thickness in the direction of the magnetic field to reduce eddy current losses. Cho U.S. Pat. No. 5,397,953 presents a stator for an axial gap machine that has a construction that with a slotted and non slotted section that is different to other constructions that use separate slotted and non slotted sections. The present invention does not use this architecture in any way. Beddows U.S. Pat. No. 3,750,273 discloses a method of making a hard slot coil with a focus on the insulation process. It is disclosed for radial gap machines with a single radial working air gap. It therefore has no relevance to the present invention which has a pair of working air gaps in an axial gap machine. Even the winding topology of Beddows is not relevant with regard to the present invention. Beddows insulates multiple strands of rectangular conductors 12 placed in slots in a radial gap machine with conductors oriented to have their width across the slot and in the direction of relative motion therefore maximizing eddy current losses—in sharp contrast to the present invention where the conductors are placed to have minimal width in the direction of motion. On another measure the winding of Beddows therefore has multiple conductors in the direction of the field in sharp contrast to the present invention where only two conductors are required in the direction of the magnetic field.

Moreover, the turns in each of the windings are stacked in the direction of the field in contrast to the present invention where they are stacked orthogonal to the field. Swett U.S. Pat. No. 6,633,106 discloses a magnet housing structure for high speed operation of axial gap motors that provide reduced stress and there fore breakage of magnets. Moreover it discloses a back iron structure attached to the rotor that deforms under high speed. The issues disclosed do not anticipate any of the aspects of the present invention. In contrast the deformation in the present invention of the rotor utilizes a unique architectural feature of the present invention where the stator windings and indeed the rotor magnet structures have mating geometries that increase the air gap at high speed. No aspects of this are disclosed in Swett. Other items in the background art Jermakian U.S. Pat. No. 6,137,203, Williams U.S. Pat. No. 6,046,518, Jun U.S. Pat. No. 6,172,442, Kessinger U.S. Pat. No. 5,744,896, Hazelton U.S. Pat. No. 6,140,734, teach aspects of axial gap machines or electrical machines in general but do not anticipate the present invention.

Although the electric machines described in the this background art are useful for some applications, experience has shown that an improved axial gap machine can be created by departing from the design techniques taught in such machines and following the principles taught and claimed in this application.

SUMMARY

In view of these background references what would be useful is an axial gap electrical machine that can improve both high speed performance and low speed performance that depend on the air gap, adequate cooling for the machine, and provide a means to optimize conductor and magnetic core cross sections to optimize machine performance.

This invention is useful as an axial gap electric machine. In such an environment, the preferred embodiment Includes a coil assembly defining a first side and a second side.

Objects & Advantages

Some of the objects and advantages of the proposed axial gap electrical machine are to provide a unique architecture to overcome critical limits in the air gap at high speeds, while maintaining high torque performance at low speeds. A related object and advantage is to provide a geometry that meets critical force concentrations within these machines.

Another object and advantage of the machine is to provide a winding structure that both minimizes Hall effect losses in the conductor and a magnetic core while optimizing both the conductor density and the core material density, maintaining a homogenous toroidal structure around the periphery of the stator, allowing a broad range of winding configurations from a single structure.

Another object and advantage of the machine is a series of phase-lagged oscillators that activate the windings in phased sequence, with power angles adjusted to either create a motor or generator configuration.

Yet other objects advantages of the present invention are unique approaches to cooling the magnet structure of the machine while in operation.

Yet another object and advantage of the machine is in a wheel motor configuration, where the wheel is separately supported and sprung but driven by a co-axial motor thereby reducing the unsprung mass of the wheel and also minimizing the distortion of the motor elements under wheel loads.

Another object and advantage of the proposed axial gap electrical machines, provides arrangements for cooling said machines.

Yet another object and advantage of the present invention is to provide a means for easy attachment and removal of said axial gap machine used as a vehicle wheel.

BRIEF DESCRIPTION OF DRAWINGS

FIG. 2K1 illustrates a single winding with a support of twisted ribbon as disclosed herein.

In applications of any windings in this invention linear machines (with infinite radius of curvature) there will of course be no need for a variation of the cross sections with rectangular windings.

FIG. 2X show a Wave winding with the strip embodiment as in FIG. 2U.

FIG. 2Y illustrates the embodiment of 2X with the loop support 140 to support the windings and provide attachment means for the assembled torroid on either or both of the inner perimeter or the outer perimeter. The form of 140 may have only the inner or outer support flanges if both are not required. Again in the case of the infinite radius of curvature linear machine there may not be a need for a variation in the thickness of the support 140 but could be useful in the finite radius of curvature machines.

Figure 1:
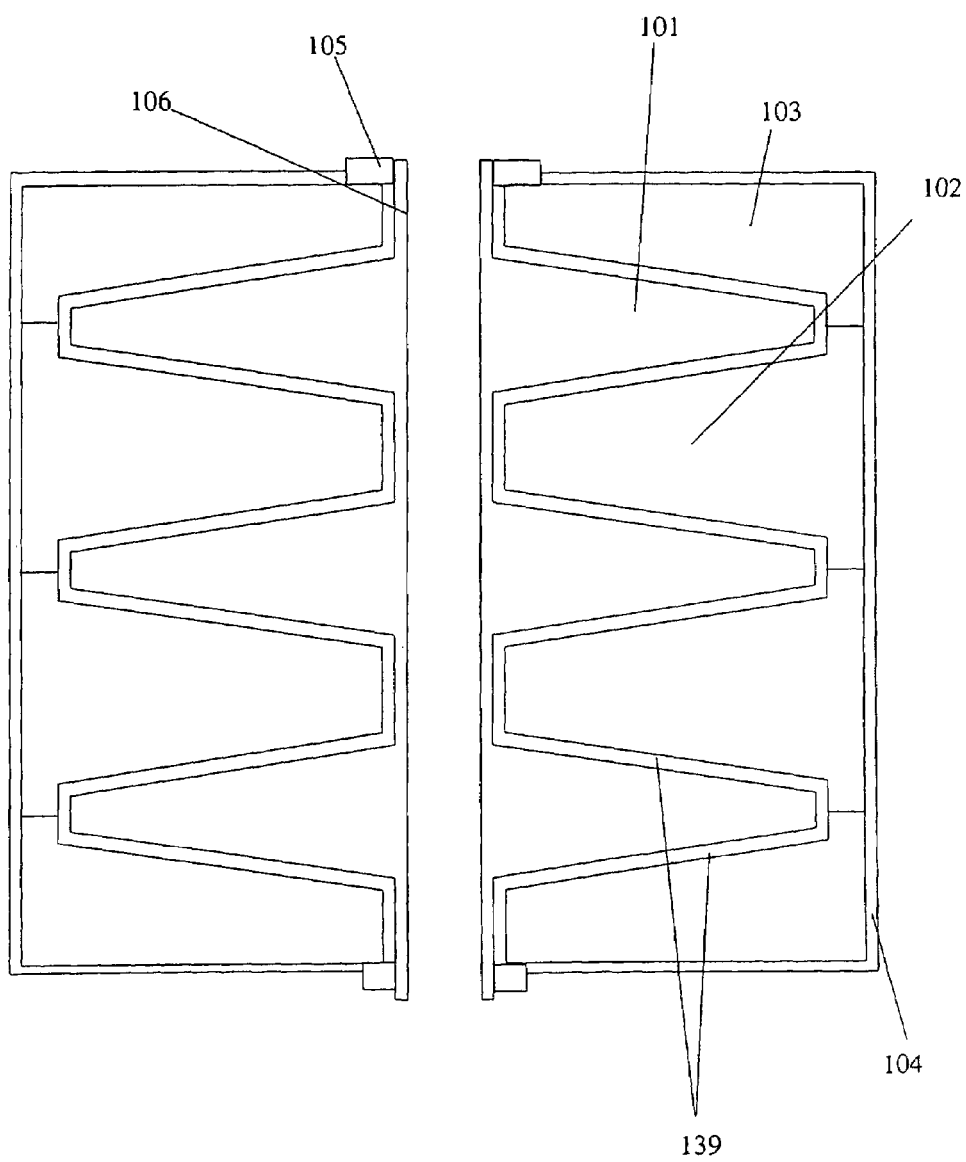
FIG. 1 is an illustration of a cross section of the axial gap machine illustrating tapered cross section for the rotor sections and the stator sections.

FIG. 2Y1 illustrates the loop support for the case of the Wave winding.

Figure 2A:
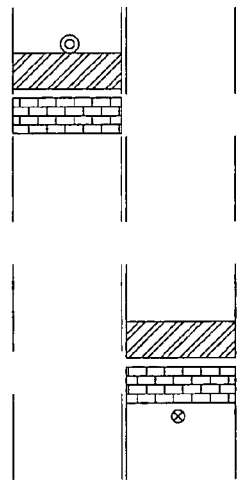
FIG. 2A is an illustration of adjoining conductors in a winding. Notably the sequence of cross sections of the down conductor and the up conductors are in the same direction unlike in conventional windings where subsequent layers of such ribbon conductors would be in opposite directions in each winding.
Figure 2B:
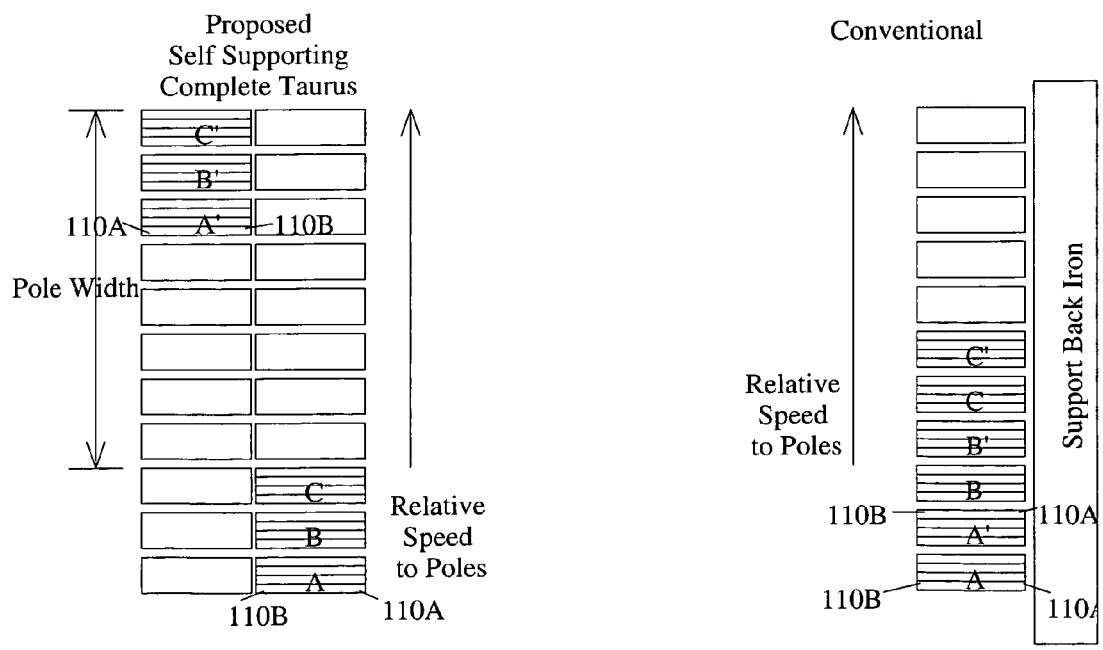
FIG. 2B is an illustration of the new proposed windings where the structure permits lagged arrangement for windings that are "universally" variable in width for a given pole size thereby allowing a variable size (and number) of windings. A conventional winding arrangement is shown for comparison.
Figure 2C:
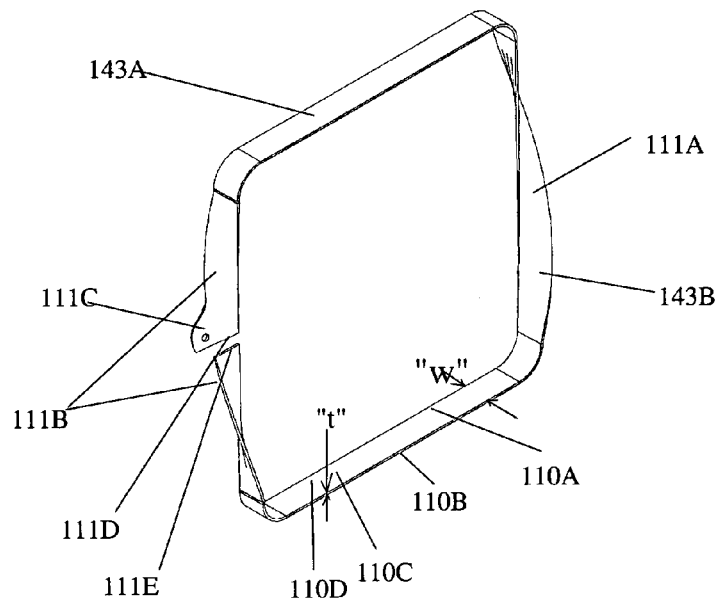
FIG. 2C is an illustration of a single turn of ribbon conductor in an embodiment of the proposed new windings illustrating the twist in the conductor.
Figure 2D:
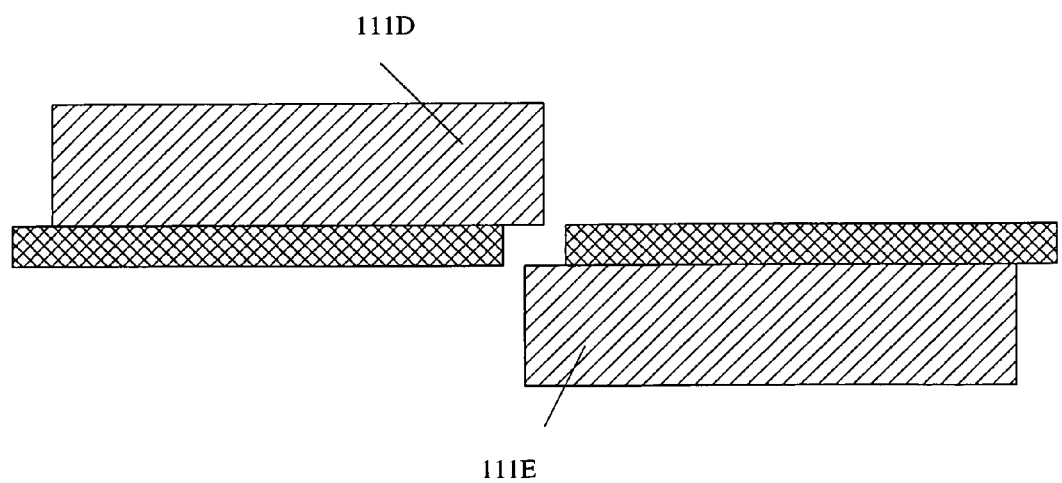
FIG. 2D illustrates an embodiment for serial connection of adjoining loops in the windings. They may be assembled as individual loops and connected using the insulator and conductor configuration such that the second end of a conductor makes electrical contact with the first end of the next conductor.
Figure 2J:
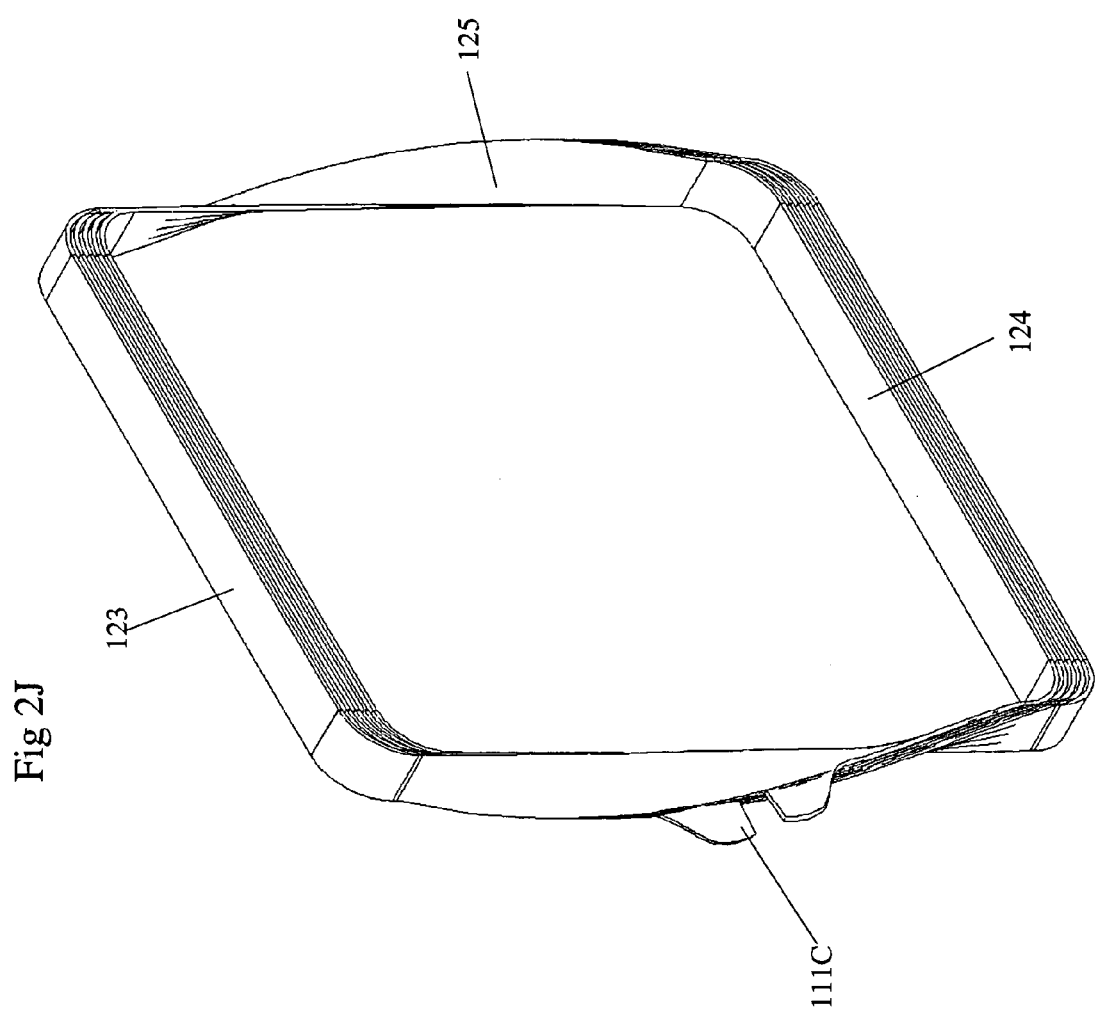
FIG. 2J illustrates a single winding as formed from a turn as shown in FIG. 2C with a zero degree net twist along the turn (a twist of 180 degrees at one non-working conductor and −180 degrees at the other) as disclosed herein.
Figure 2L:
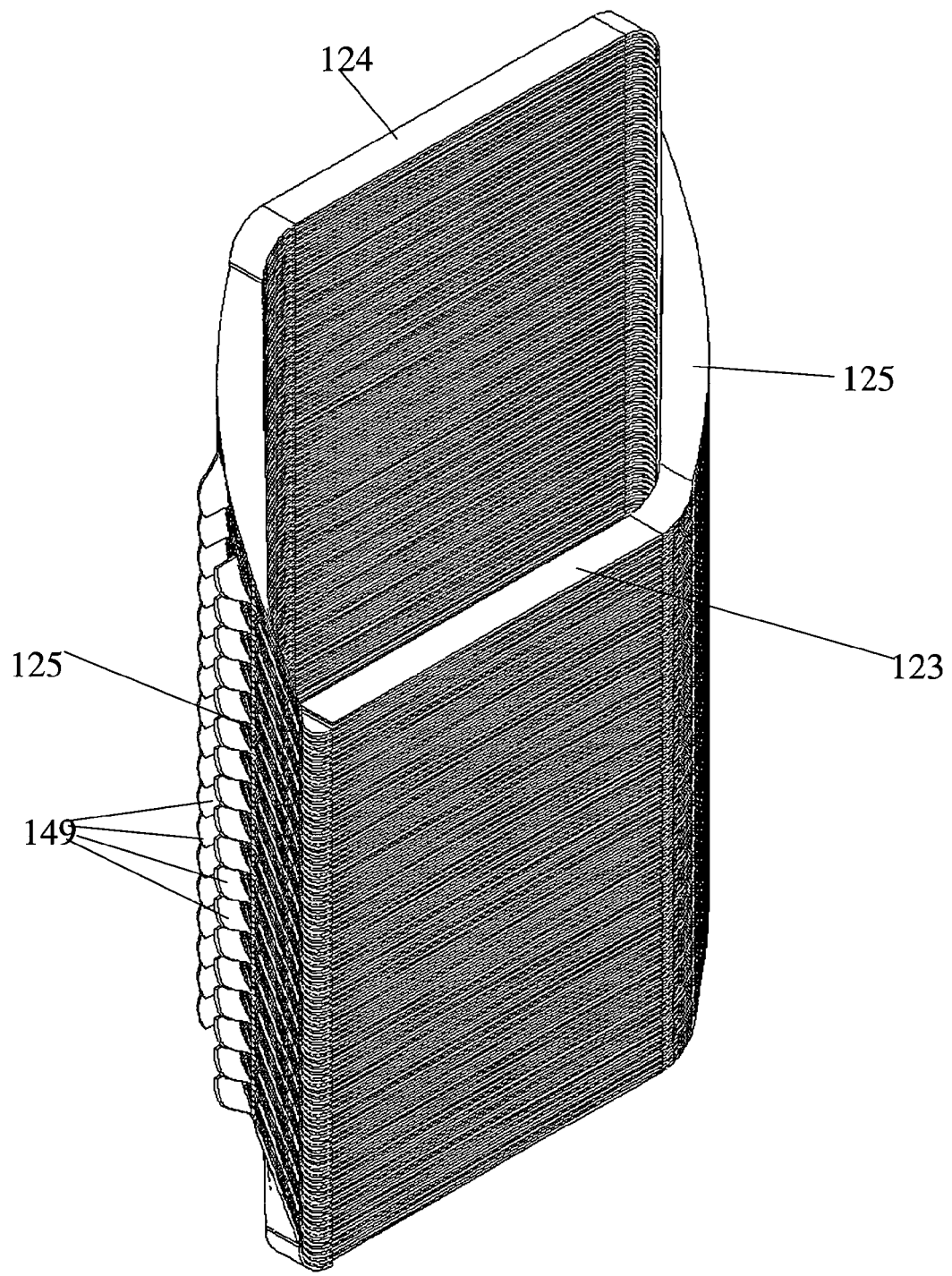
FIG. 2L shows multiple windings as in 2K interlocked together illustrating further the adjoining conductors across the winding and in the direction of the field.
Figure 2Q:
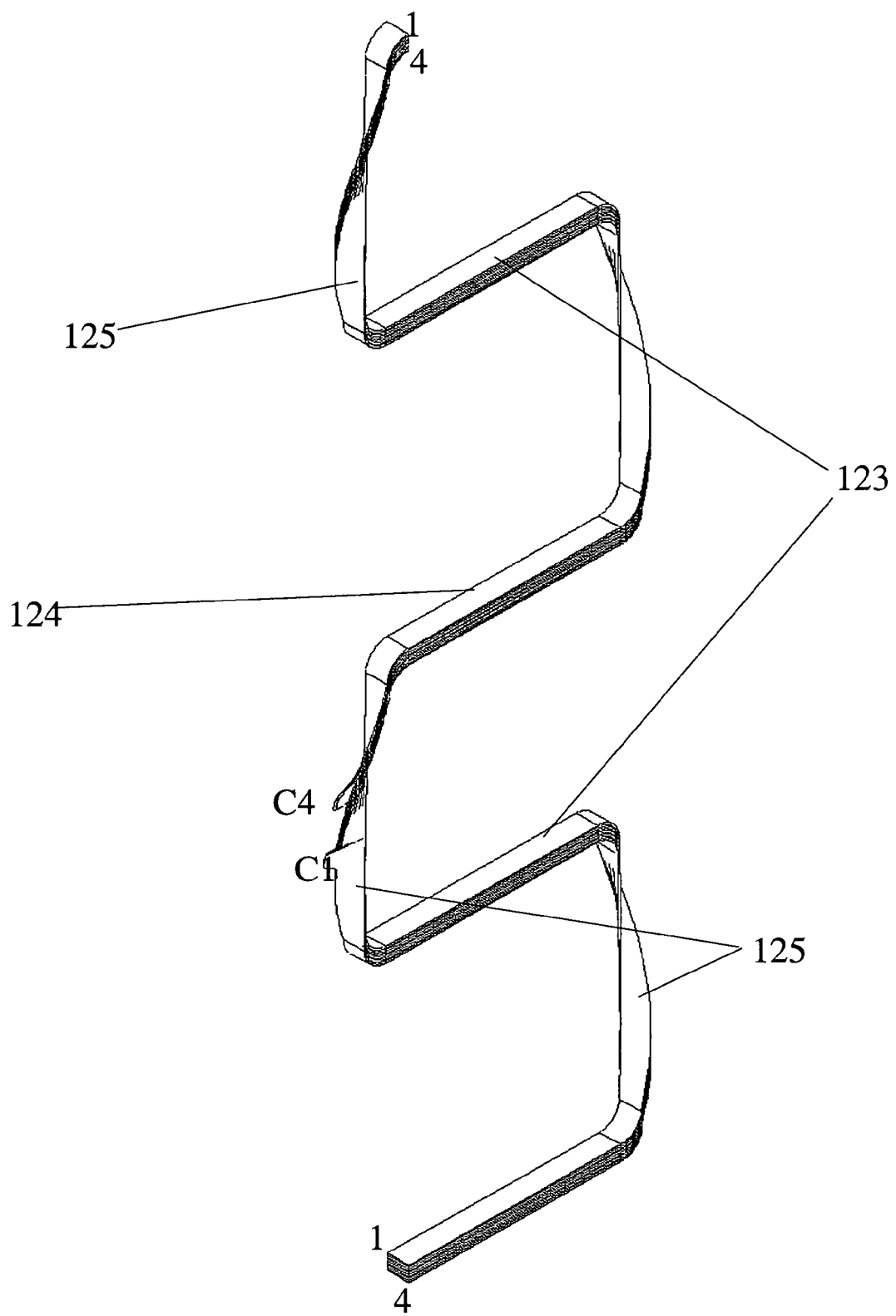
FIG. 2Q illustrates a section of a single winding from a turn as shown in FIG. 2P.
Figure 2R:
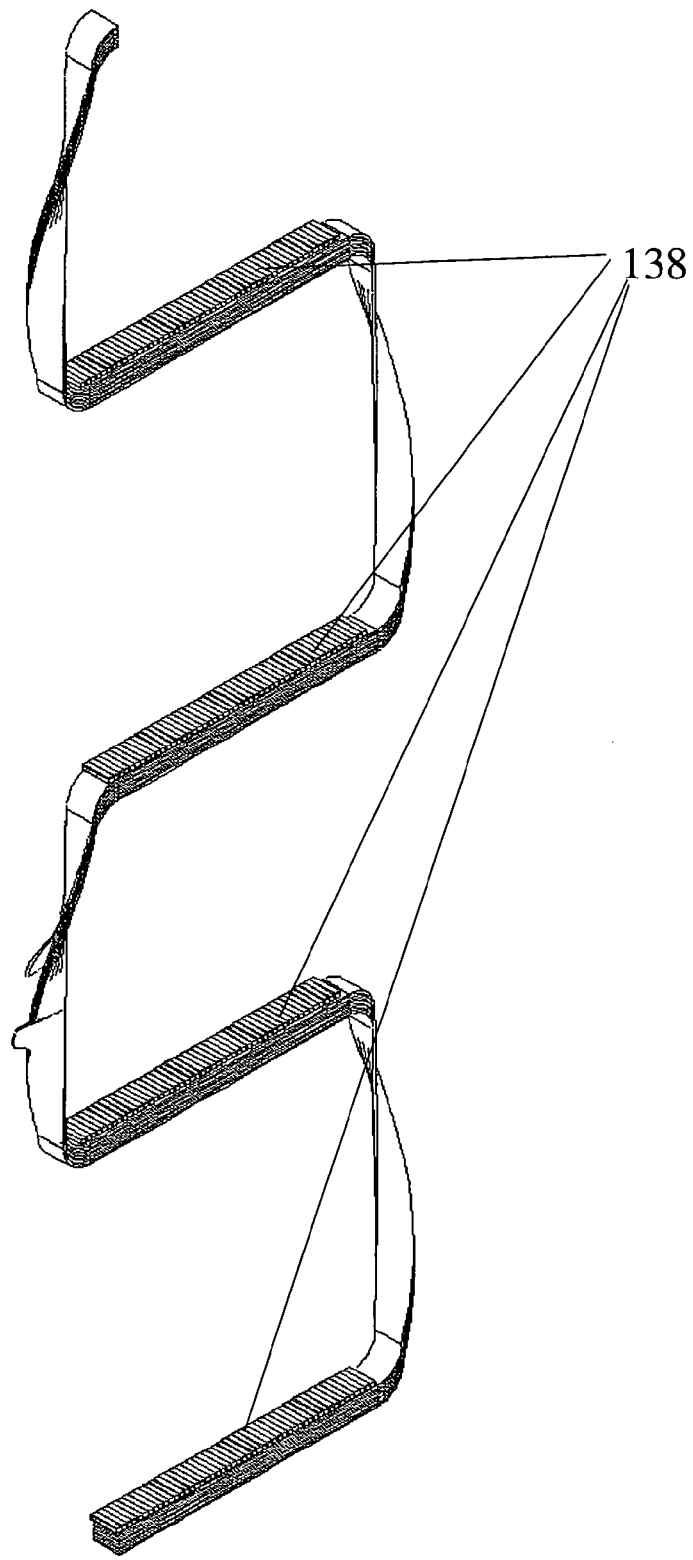
FIG. 2R illustrates the winding in FIG. 2Q with core material attached to a section of the winding.
Figure 2S:
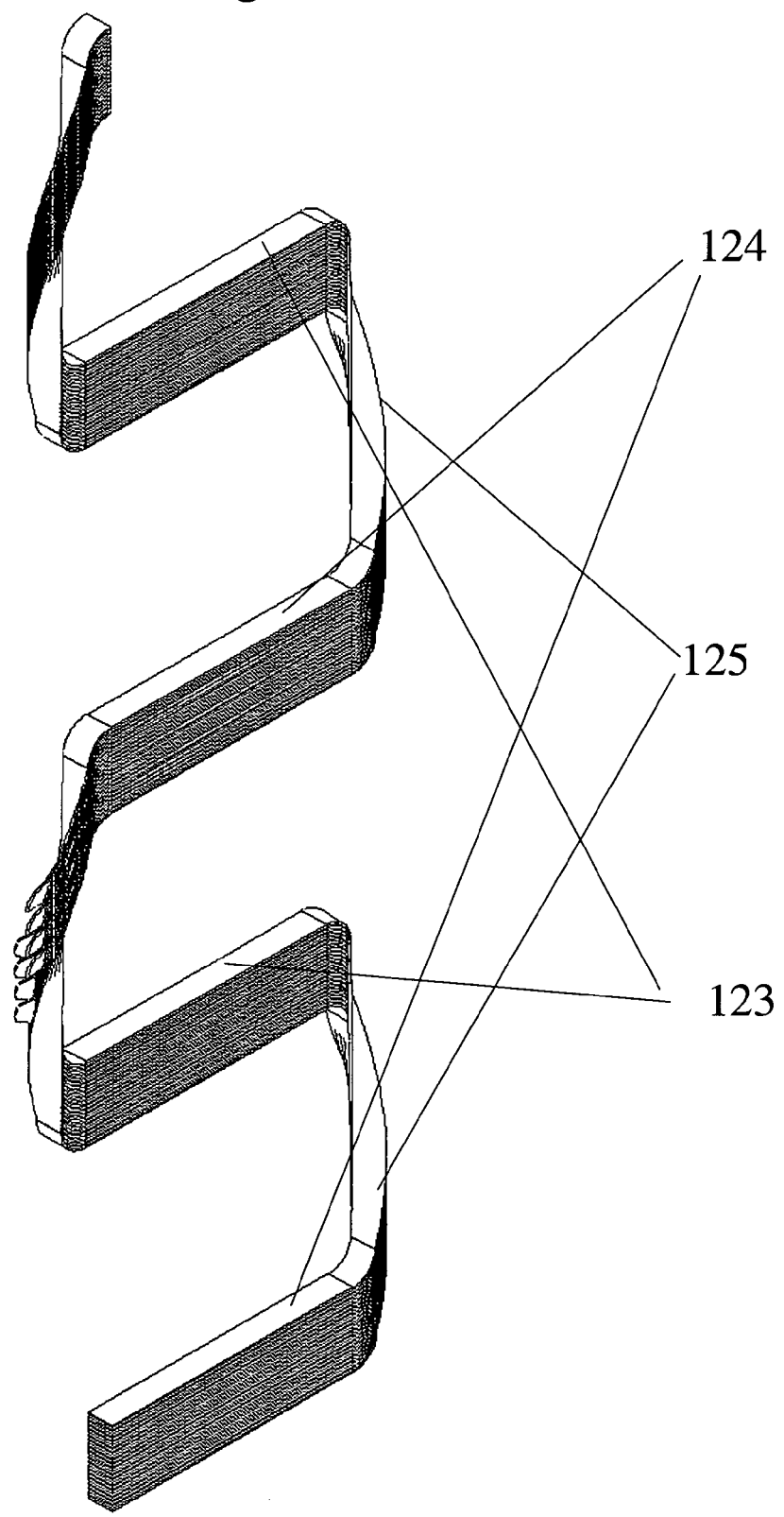
FIG. 2S illustrates multiple windings composed of sections as in FIG. 2Q.
Figure 2:
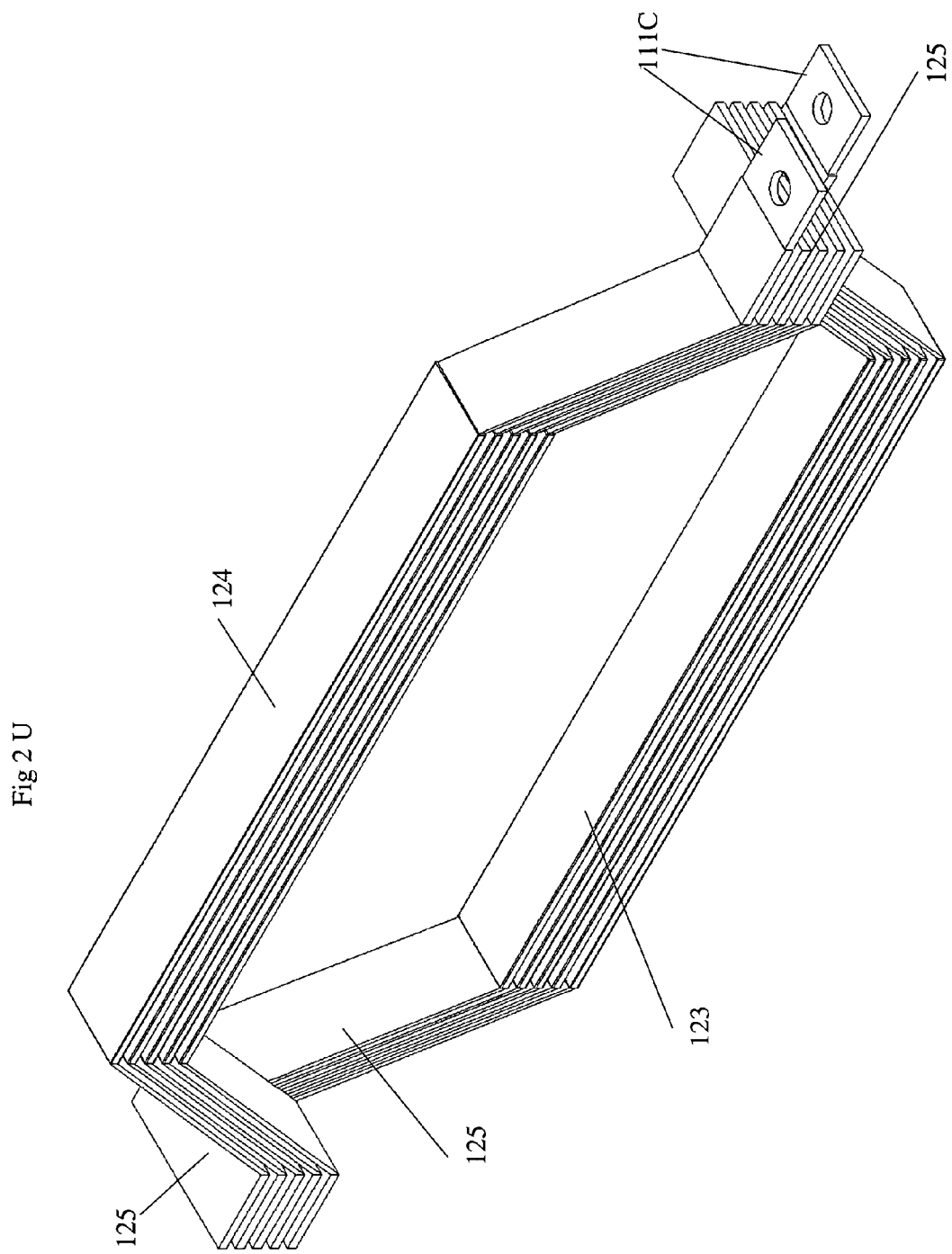
FIG. 2K illustrates a single winding as shown in 2J with magnetic core material attached.
FIG. 2M illustrates a special case of FIG. 2L with a back iron element between the two arrays of conductors. Further is shows the direction of the magnetic field and the angle of rotation.
FIG. 2N. Illustrates the array in FIG. 2L in an exploded circular form along the angle of rotation.
FIG. 2P shows a single turn of a winding with the 360-degree twist over the turn as disclosed herein.
FIG. 2T shows FIG. 2S with back iron elements between the two arrays of conductors.
FIG. 2U illustrates another embodiment of the invention where a strip conductor forms the windings. This figure shows a complete winding with connectors 111C.
FIG. 2V shows the winding as in FIG. 2U with a magnetic core material attached to the winding. The core material may have an increasing thickness towards the radially outward end of the winding to accommodate the required curvature of the assembled windings of the machine. However, in the case of machines with an infinite radius of curvature as in a linear electrical machine such variation in thickness may not be useful.
FIG. 2W illustrates a winding as is FIG. 2V with a loop support 140 attached to one side for bracing the winding and attachments to either or both of the edges of the wound element following assembly. The form of 140 may have only the inner or outer support flanges if both are not required. Moreover the cross section of this element can be increased radially to accommodate the curvature of the Taurus generated by the assembled windings of the electrical machine. This will facilitate smaller required accommodation in length differences between inside and outside conductors of windings and even allow rectangular windings in some cases for rotational machines. Linear machines with an infinite radius of curvature may not required such changes in the cross section to accommodate curvature.

FIG. 2Y2 illustrates the loop support for the Lap winding.

FIG. 2Z1 illustrates a method for fabrication of the windings in FIG. 2U–2Y. The strip conductor is folded on itself and then again folded on itself to rotate about 180 degrees. It can then be bent to form either a Lap or a Wave winding. The illustration shows one folded end. The other ends will be bent out ward (as illustrated) for the Wave winding or bent inwards for the Lap winding and the same folding as in 125A performed at the other edge.

FIG. 2Z2 illustrates another embodiment of the strip used in FIGS. 2U–2Y. With FIG. 2Z3 illustrating the flat strip that is bent to form the illustrated Wave winding in 2Z2. the adjoining winding turns are attached to each of the 125B2 flanges at the seam 125B1. Each of the seams 125B2 at 125B1 will be attached to adjoining turns of the winding and thereby form a winding section as shown in FIG. 2Z2A and FIG. 2Z2B. Attachment can used several methods in the background art including seam welding techniques.

Figure 10:
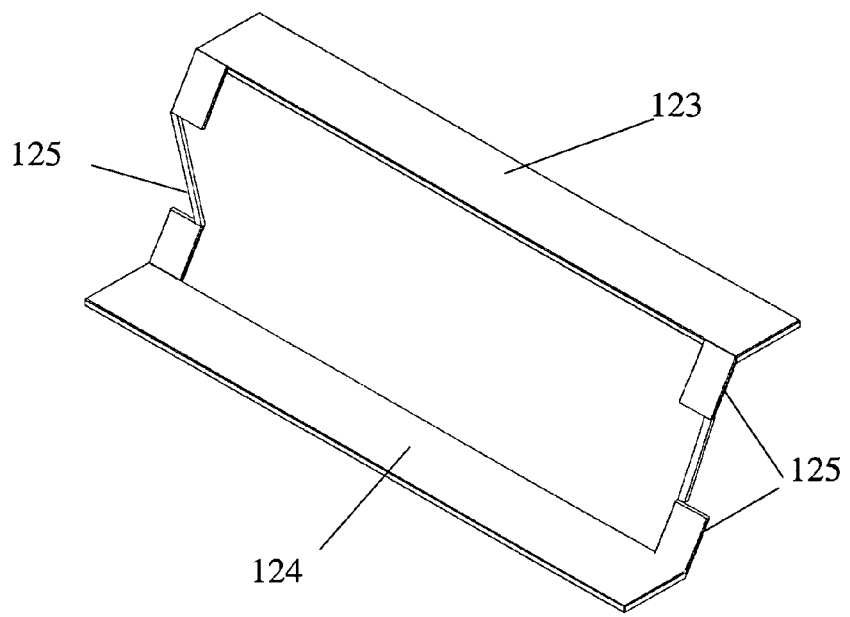

FIG. 10A illustrates a turn of a conductor topology

Figure 10B:
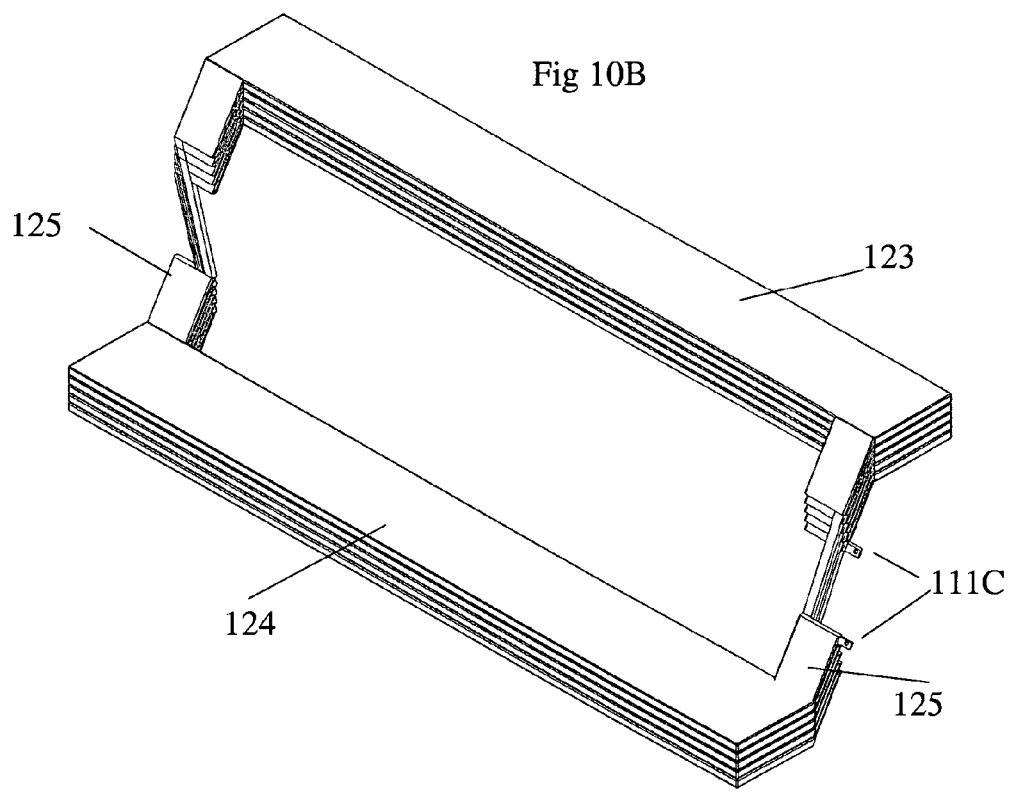

FIG. 10B illustrates the interlocked adjacent turns of the winding topology in FIG. 10A that will form the double torroid of working conductors.

FIG. 10C illustrates interlocking windings.

Figure 13:
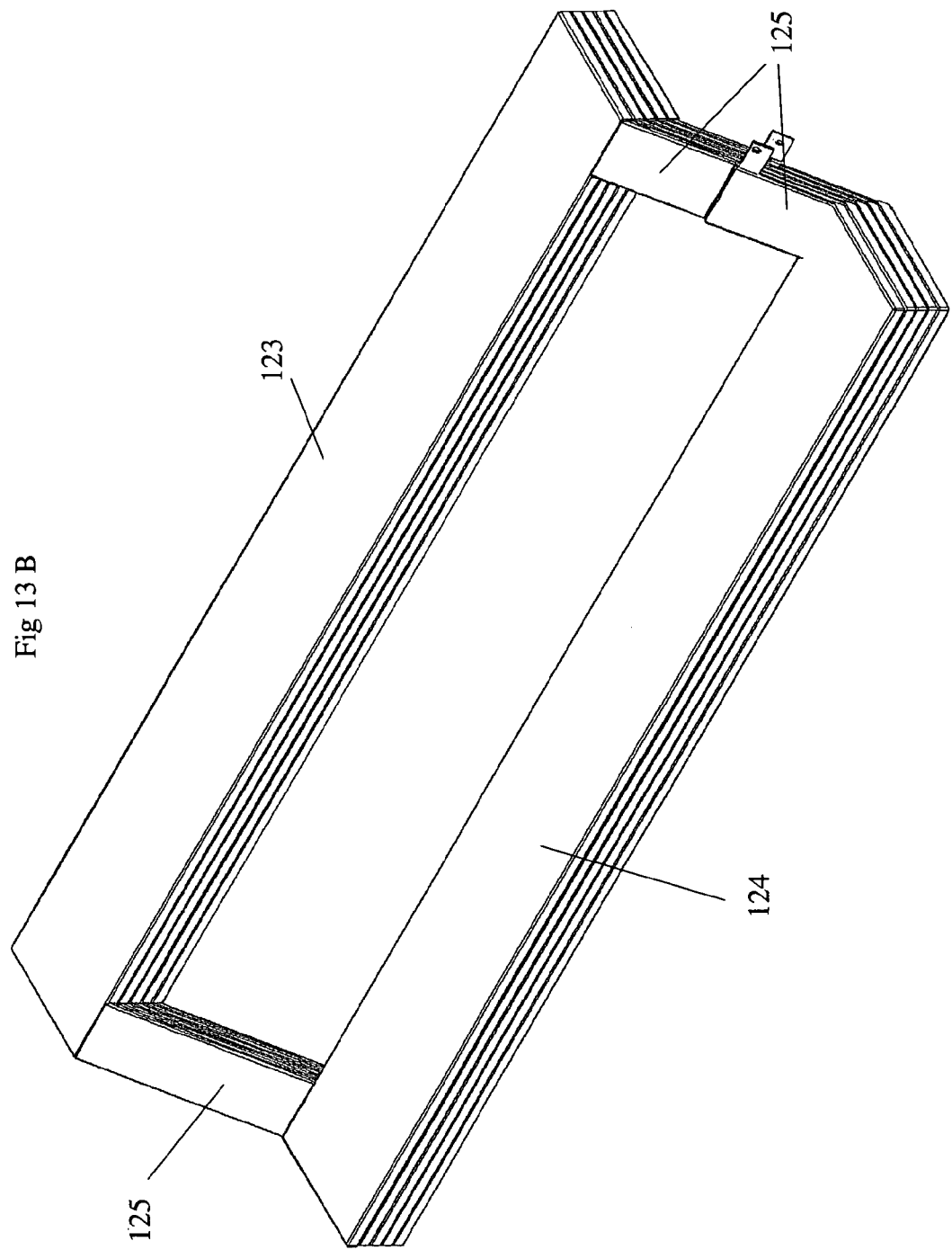

FIG. 13A1 and 13A2 illustrates another embodiment that has simpler arrangements for the non-working conductors but will result in working conductors that are not disposed with their widths radially to minimize eddy current losses. This illustration shows a gap in the non-working conductor at the inner axial end. These may be connected in series with adjoining lops or in parallel to adjoining loops the arrangements for these are noted herein.

FIG. 13B illustrates a winding using turns as in FIG. 13A1, A2.

Figure 13C:
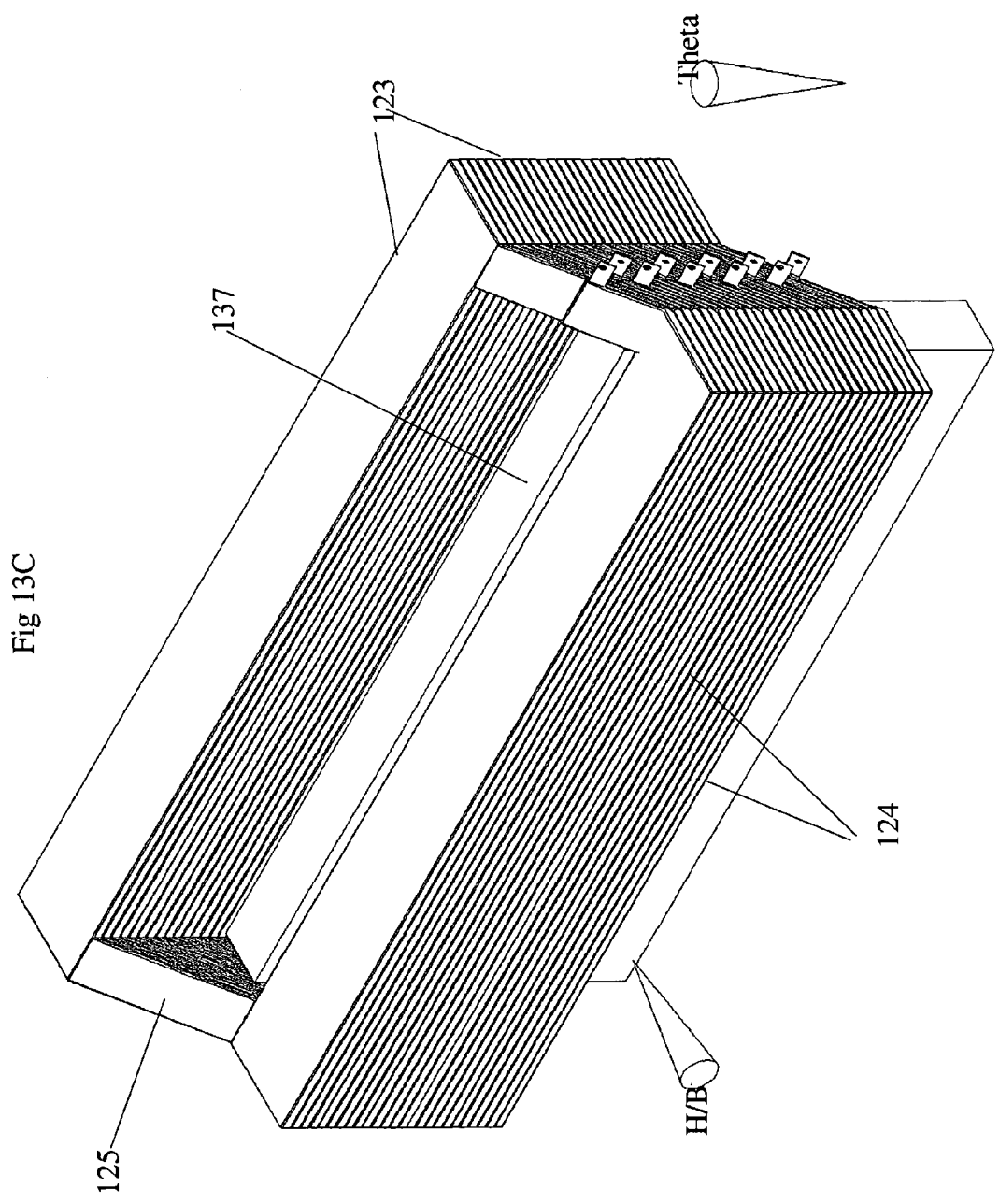

FIG. 13C illustrates multiple windings as in fang 13B with back iron elements between the two arrays of conductors.

Figure 13D:
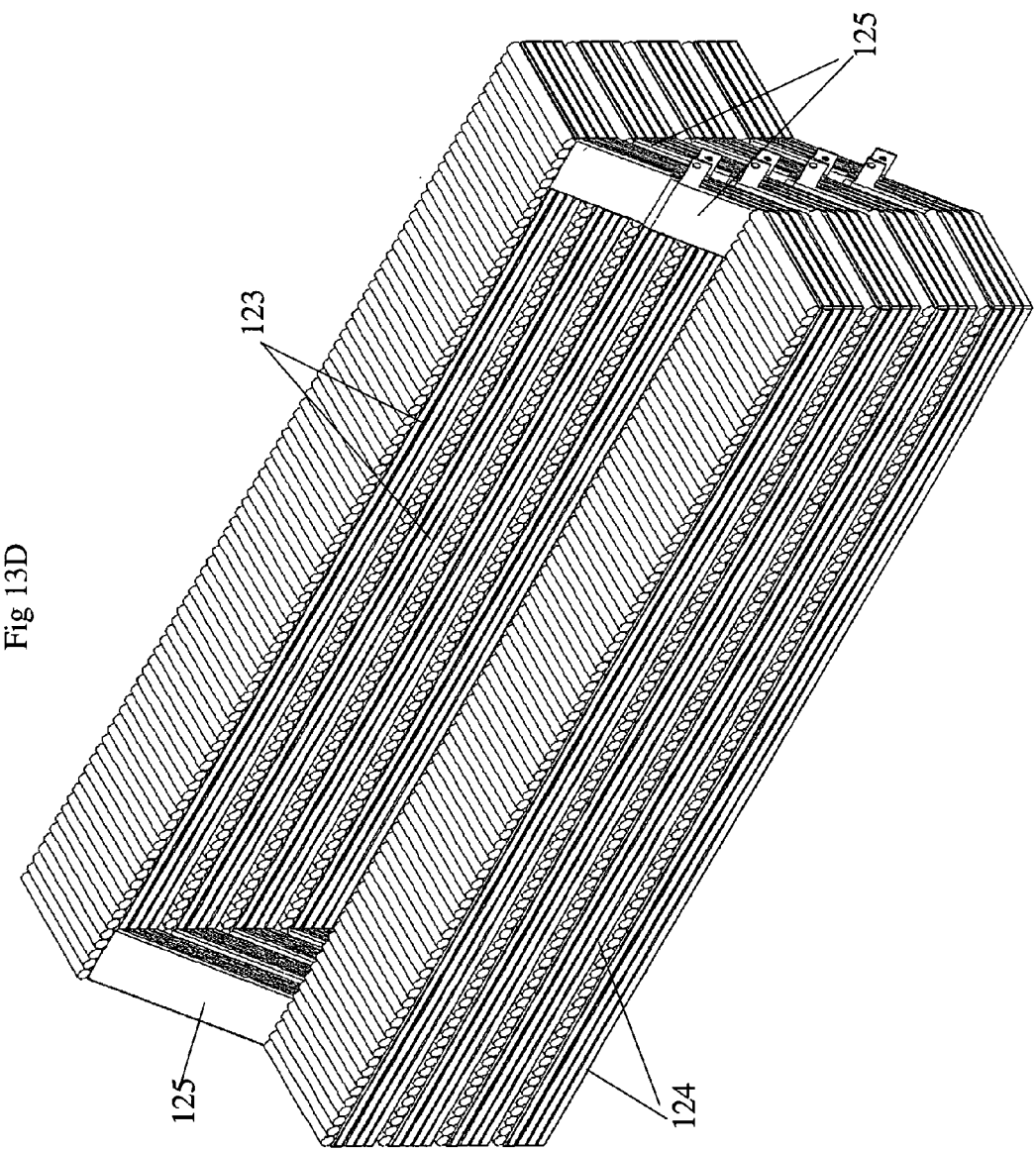

FIG. 13D illustrates windings as in FIG. 13B with core materials attached to the windings.

LIST OF REFERENCE NUMBERS

101—Stator winding section tapered construction
102—Rotor Magnet assembly middle section-tapered construction
103—Rotor Magnet Assembly end section-tapered construction
104—Motor housing
105—Rotor Bearing
106—stator support axle.
107A—First Ribbon conductor first Radial component (current into paper)
107B—First Ribbon conductor second radial component (current out of paper)
108A—Second Ribbon conductor first Radial component (current into paper)
108B—Second Ribbon conductor second radial component (current out of paper)
109A—Indicator—current out of paper
109B—Indicator—Current into paper
110A—Edge 1 of the ribbon conductor (thickness across edge)
110B—Edge 2 of the ribbon conductor (thickness across edge)
110C—Wide face 1 of the ribbon conductor
110D—Wide face 2 of the ribbon conductor
111A—Twist in center section of ribbon conductor
111B—Twist in outer section of ribbon conductor.
111C—terminal or flanges
112—Open hole on this layer—no contact with pin
113—Closed/tight hole on this layer—electrical contact with pin
114—flexible peripheral wheel coupling
115—Wheel
116—Motor/generator Rotor
117—Motor/Generator Rotor bearing
118—Wheel bearing
119—leaf springs—torque transfer in tension
120—An inside single magnet element as part of a single magnet section.
120A—first element of a pair of poles of magnets
120B—second element of a pair of poles of magnets
121—An edge single magnet element as part of a single magnet section
122—The inside end of the magnet sector showing a narrower cross section
123—working conductor—side 1 of torroidal coil
123B—working conductor—side 1 of torroidal coil—flat formed conductor case
124—working conductor—side 2 of torroidal coil.
124B—Working conductor—side 2 of torroidal coil in flat formed ribbon embodiments
125—Non-working conductor that meets the topological constraints for this embodiment
125A—Folded conductor on flange (two 90 degree bends for direction of ribbon)
125B1—Flange attachment seam
125B2—attachment flange
125B3—attachment side non working conductor section
125B4—non-attachment side non working conductor section
125B6—Non attachment side flange
126—Cold junction of the bimetallic construction of windings.
127—Hot junction of the windings of the bi-metallic construction of the windings.
128—Gap where loop is connected to adjoining loops at each end series or parallel
129—Working conductor—metal 1
130—Working conductor—metal 2
131—bimetallic junction 1
132—bimetallic junction 2 (between adjoining loops)
133—Stator mount and wheel shock absorber housing (connected in some embodiments to wheel assembly steering and shock absorption devices)
134—Wheel axle
135—Support between wheel axle and shock absorber (either supporting the wheel axle or the shock absorber depending on the embodiment)
136—Wheel support
137—Back Iron elements
138—Insulated Core material
139—Working air gap
140—loop support
141—Axis of rotation
142—Internally braced toroid
142A—Internal periphery of Internally braced toroid
142B—External periphery of Internally braced toroid
143 A—Working segment of conductor
143B—Non working segment of conductor
144—Radially inward direction
145—Radially outward direction
146 A—First support element (for one embodiment)
146B—Second Support element (for one embodiment)
147 A—First Toroid of rotation
147B—Second Toroid of rotation
148 A—First working segment of a conductor
148B—Second Working Segment of a conductor
149—splines created by flanges on windings
150—line parallel to axis that crosses at most two working conductors

DETAILED DESCRIPTION OF INVENTION

The proposed axial gap machine has a plurality of disk-like magnet assemblies (the "magnetic field element"), that constitute the rotor of the machine, that are installed to the outerbody of the machine. The outer body in turn completes the magnetic circuit for the magnet assemblies, which provide the means for air gaps with axial magnetic fields. Moreover, one or more of these rotor magnet assembly disks may be supported with bearings on the axis to which the stator is fixed resulting in the assembled rotor resting on the central axle on a plurality of bearings that are mounted at the radially inner edge of two or more of the said magnet assemblies that interleave the stator disks. Such an arrangement may be constructed from separate disk assemblies of magnets as in rotors of axial field machines 102, 103 of FIG. 1—well disclosed in the background art, that are attached together leaving adequate space between them for the required axial air gaps and a stator in each intervening space between adjoining rotor magnet assemblies.

The stator is composed of a plurality of disks 101 of FIG. 1, that are each composed of windings that are fixed to the central axis of the machine. Each of these disks are interspersed with the rotor disks as described above. The said axis also provides the support for a wheel 115 in a vehicle or gear or pulley arrangements in machines with bearing.

According to another feature of the invention, coils (or "wound element") for an electric machine may be fabricated by conventional windings and cores or the following means.

Windings may be composed of elements constructed in sectors of a torroid or annular ring that interlock as follows: Each of the conductors are shaped to form a "loop" with open ends preferably at the edge on the outer circumference of the torroidal or annular shape that is described. The cross section of the conductor is of a ribbon with width much greater than the thickness to minimize the Hall effect on the conductors. Magnetic core material 138 of small cross section and in elements of length equal to the width of the ribbon may be attached to the conduction ribbon on one or both sides with insulating film. The conducting ribbon is of course insulated. The ribbon shaped conductor may be formed in many ways. One of the approaches are as follows: The ribbon shaped conductor is formed into a loop first without twisting the ribbon (untwisted or 0 degrees twist overall) as in FIGS. 2C, 2J, 2K, 2L, 2M. The "loop" is further formed by straightening two diametrically opposed edges to form the two radial sections (the "working conductor segments") 123, 124, at a predetermined angle to each other that define the sector of the torroid or annular ring that a single loop of the winding will cover. However, one of these two radial sections of ribbon is twisted by 180 degrees and maintains this angular orientation along its entire length. This results in the corresponding wide surface of the ribbon on both radial sections facing the same direction. This twist in the ribbon results in the twist being entirely generated through 180 degrees at the sections along the outer circumference of the "loop" 125. Finally the two radial sections are placed so that they are radii of adjoining cylinders about the same axis. Stated another way, the circles of rotation of the two radial sections of the ribbon develop two cylinders that are co axial and adjoining each other but does not intersect each other. This construction of the loop allows a series of such loops to interlock with each other as in FIGS. 2J, 2K, 2L, 2N to form a complete torroid or annular ring without any gaps. Moreover, if the magnetic material 138 is bonded to the ribbon as in FIG. 2K, this will form a distributed core as well. With this construction of interlocking ribbons, the cross section of the torroid or annular ring has two ribbon shaped conductors edge to edge one each fron the loops on either side of the torroid or annular ring. Each of the independent loops has terminals or simply flanges 111C at each end of the ribbon loop positioned on the inner or outer circumferential non-working section. Such flanges may be connected in series or parallel to each of the phases of the power circuits, to meet the particular winding need. Such connections may be made with pins that connect selected flanges. Notably, such a winding can be universal except for the sector angle that is described by the loops, in that the individual loops can be connected to any number of phases and turns per winding. A further improvement would be to use conductors of widening cross section on the radial sections to maximize the conductor crossection in each loop. The ribbon may alternatively be twisted by 360 degrees from end to end of the "loop" (instead of a net 0 degrees) by twisting each of the circumferential sections by +180 degrees in the same direction as in FIGS. 2P, 2Q, 2R, 2S, and 2T. In either of these arrangements, the optimal utilization of the stator winding volume is achieved by adjusting the thickness of the conductors in relation to the thickness of the ferromagnetic material to maximize the flux linkage to the rotor by lowering the reluctance with more ferromagnetic core material while maximizing the conductor thickness and the current density. The conductor ribbons may be stranded and or braided wire to be more flexible in this arrangement. In some embodiments the entire back iron shaped as an annular flat disk 137 in FIGS. 2M, 2T and 13 C, between the two sections of conductors provides additional rigidity to the windings but is not physically connected to the axle. Other similar embodiments may not have a back iron element at all and have the formed windings (with interspersed core elements if used) support themselves as the entire stator. The entire load is transferred through the material of the windings to the axle. In other embodiments, the ribbon conductors may be either slotted on the inside non-working arc sections or bent around (at the sections of the ribbon that is twisted, at a point where the width is parallel to the radius) as in FIG. 2K1 to accommodate radial elements of the supporting back iron that may lie between the concentric cylinders formed by the windings as noted above. The back iron may be radially serrated to accommodate the edges of the windings and bonded together by methods well disclosed in the background art. Moreover, if the stator windings are predefined at the time of assembly and the physical angle of each phase winding is known in advance, the back iron may have raised sections that index the windings between these sections of the ribbon windings to transfer torque during operation. In addition the ribbon conductors may be shaped to index the sides of the back iron disk. Yet other embodiments several selected adjacent sections of the ribbon windings have broader cross sections in the radial (or working) sections of the ribbons thereby creating a set of splines that may interlock with splines in the back iron to transfer torque.

The above winding arrangement may also be used in an embodiment with the permanent magnet rotor fixed to the axle and the stator attached to the housing of the machine.

Several embodiments are possible with the windings in the current invention using topologically equivalent conductor shapes. For example individual ribbon loops may be constructed to have two flanges near the axial edge of the working conductors on each of the legs of the loop as in FIG. 2K1, so that in the winding position these flanges of adjoining loops form a ring around the axis of the machine that can be used for support and also heat dissipation if they engage fixed elements of the axle. Moreover, such flanges may be arranged to be of varying lengths such that when assembled as a winding they form a splined profile that will better transfer torque to the axle.

Another application in using topologically equivalent conductors to flat ribbon conductor loops is to fold the conductor at the non-working ends to reduce the edge length on one side and not the other so as to allow easier assembly of the loops in the stator torroid. Yet another topologically equivalent form is to have an "O" shaped flat ribbon conductor as in FIGS. 10, 10A, 10B, 13, 13A1, 13A2, 13B, 13C (that may be stamped out) with straight sides that correspond with the length of the working conductors 123, 124 of the loop and straight conductors of the length of the non-working peripheral and axial conductors respectively 125. The closed form needs to be cut and separated at a point on the inner non-working conductor section to connect with adjoining loops. Sections of the Non-working conductors can then be bent to be perpendicular to the working conductors to permit the loop and winding configuration of the twisted conductor torroid construction noted in this invention with one notable difference—The torroid generated by these open loops that form the windings may not have an axis perpendicular to the width of the conductor but be at an angle thereby compromising he eddy current loss characteristics and the air gap.

The above winding arrangements utilize the entire space in the torroid or annular ring with either conductors or magnetic core material. This is particularly so in embodiments where the radial conductors are made to be wider towards the outside of the coil. Furthermore it is possible to "grind" the windings or ribbons along with the distributed core to have any desired cross section for the stator thereby optimizing the airgap that may follow a non-linear rotor cross section as in some special rotor configurations noted in this invention as in FIG. 1.

Yet another embodiment will have the ribbon conductors packed with powder metal and compacted with dynamic magnetic compaction or other techniques available in the background art. This will improve the efficiency of utilization of space between conductors for a lower reluctance magnetic path. This is particularly useful if a constant thickness conductor is used and there is a greater gap between adjoining conductors towards the outer end of the working conductors. Yet another feature of this invention is an embodiment that has the radial sections of each ribbon conductor preformed and attached to a (insulating) membrane bag of the same shape as a side of each of the radial sections of the conductor, containing powder metal in a predetermined quantity. At the time of assembly of the coil, the powder metal will be redistributed in the thin membrane bags to take up all the available space between the conductors—more towards the outer ends of the radii. The assembly may then be compacted as noted above. Following the assembly of the windings as follows, the surface of the winding with the attached core material may be ground or machined to expose the surface of the ribbon conductor from the surrounding core material so that a magnetic gap is established to minimize magnetic leakage in the machine.

The present invention may use rotor disks with magnets constructed in the conventional manner as disclosed in the background art or use rotor disks that are tapered to be narrower at the center and broader and the periphery where they are attached to the body of the rotating shell, and wherein the stator disks are tapered to be broader at the base at the axis and narrower towards the edge of the disks. Thereby the geometry will ensure that of the taper rates are the same for stator and the rotor, the airgap will remain the same radially across the machine for all the disks. Moreover, as the greatest torsion forces on the stator are near the axis and the greatest tortional forces on the rotor are near the periphery, this geometry can optimize material usage to minimize weight of the machine for the required strength characteristics.

An additional feature of the present invention with the above tapered rotor design can be utilized to optimize the air gap for different speeds for operation. A small air gap is desired in the machine at low speeds to maximize the torque generated by the machine. However as the machine builds speed, both back EMF and air resistance in the air gap will limit the speed of the machine significantly. The tapered design in the present invention can be adapted to automatically increase the air gap at high speed. This can be a smooth gradual process that matches the gap for the speed of performance. This is achieved by moving the sections of the rotor radially outwards by a very small amount. Notably, by having different gradients of taper of the sides of the rotor radially, the rate of change of the air gap can be different for different radial distances from the axis. For example, as the relative linear velocity between the stator and the rotor at the periphery of the motor rises more rapidly as the motor accelerates, a greater increase in air gap could be beneficial at the periphery. This can be achieved by having a steeper taper at the periphery of the motor (rotor and stator) and a more gradual taper towards the center of the motor. The exact tapers can be designed using computer simulations of the effect of back EMF and turbulent flow in the air gap. This movement may be achieved with centrifugal force on the rotor sections and special fabrication of the radial magnet sections (and brackets if used) of the rotor and the intervening mechanical connectors that may be spring loaded to permit slight expansion circumferentially and a special construction of the rotor with the bearings on the axle to permit a slight extension radially. Such an arrangement can "stretch" the outer supporting ring of the rotor under centrifugal force to increase the air gap with the above tapered design. The outer supporting ring can have spring-loaded telescoping sections between the magnet supports that allow this increase in diameter under centrifugal force. The magnets (with radial support brackets if used) may be connected rigidly at the outer periphery but slidably at the inner end to a ring support that may be attached to a bearing that support the magnet assembly particularly with regard to axial movement.

Yet another approach for changing the airgap is to utilize the torque generated in the machine to stretch elements of the rotor. For example if the sectors of the rotor are constructed as radial sections (for example for each pole section separated physically) and supported pivotally at the center and the external periphery by two annular rings or other support (the inner supports must allow some movement as well: such as with an elongated slotted pivot), such that when the sections are perfectly radial there is a larger gap between the radial elements (not the working air gap between the rotor and stator). A twisting of the inner annular ring about its axis, forces the "radial" magnet sections to move at a slight angle to the radial but increases the radial distance at each point on the magnet from the axis by moving the slotted pivots slightly in their respective slots. Under low load and no-load conditions the sectors of magnets are designed to be at a small angle to the radial direction thereby increasing the working air gap as a result of the tapered construction of the rotor and stators. However, under high load conditions the torque generated by the motor will drive the magnet sectors to a perfectly radial position thereby reducing the working air gap and increasing the power delivered by the machine and the torque generated against the load. The mounting arrangement will of course have to be spring mounted to resist these changes at low torque but allow this distortion at high torque. There should also be an end stop device to prevent the rotor sections from moving past the radial position to incline from the radial in the opposite direction to the no-load position under extreme load and thereby reducing the ability of the machine to provide adequate torque as a result of the increase of the working air gap.

Yet another embodiment can use differential expansion of the rotor with regard to the stator to increase the air gap at higher temperatures with the tapered design in the present invention. Each of the magnet structures that are positioned radially are connected together circumferentially and to the hub in the center by materials that have a high coefficient of expansion with heat in addition to their required load bearing properties required in this application. As the temperature of the machine rises the expansion on the rotor of the connecting elements between the magnets and the connecting elements to the hub(s) is designed to exceed that of the expansion of the stator and as result of the tapered construction will cause an increase in the gap of the machine.

Yet another embodiment of this invention has a magnet rotor attached to the axle with the stator attached to the housing and comprising windings with a higher coefficient of expansion than the magnet assemblies, thereby increasing the air gap with the tapered rotor/stator arrangement.

Yet another embodiment utilizes the fact that the magnets need to be supported to resist a tangential torque and an outward radial centrifugal force while in operation. As the rotor is supported in these embodiments by the motor body structure, the magnets in sectors may be fixed on the outer arc edge and radial air gaps (between radial sectors of magnets) permitted between adjoining magnets with only minimal support with spacers or minimal brackets to support the magnets to equalize torque between the magnets and reduce vibration. These radial air gaps contribute to the cooling of the magnets—a particularly important factor in axial gap machines. The cooling can be further improved by inclining the magnet faces between the magnets to be at a small angle to the axial direction so that the gaps scoop air from one side of the rotor and deposit it at the other side of the rotor. The Air return path could be at the periphery of the motor where cooling devices may be harnessed to lower the temperature of the air. The Air that is forced through the motor may be retuned to the other side of the motor after cooling in tubes on the periphery of the motor or inducted on one side of the motor and discharged on the other side of the motor. The latter arrangement will benefit more from a low ambient temperature but suffer from the disadvantage of impurities in the air that may damage or impair the motor operation. Some embodiments for such cooling follow in the present invention. Notably the stator windings in adjoining sections along the axis will need to be skewed to ensure that the faces of the magnet line up with the rotor windings on both sides for the rotor (in the event of stator windings being present on both sides for the rotor magnet). Still other embodiments have the radial sections of the magnets subdivided into smaller radial sections and interspersed with insulation thin film and pinned together to form each of the magnets that comprise the set of magnets around the perimeter of the rotor. This construction will reduce the Hall effect heating and power loss in the magnet assemblies.

Yet another feature of this invention is the use of a number of oscillators that are each phase lagged to one another, the set of said oscillators together forming a complete 360 degree electrical phase shift and may be driven off a controller (for example a hall effect controller) that identifies the position of the rotor for synchronizing the set of oscillators. These oscillators are connected to each of the phases of the motor (or generator) The power angle, and frequency are controllable with large capacitors (ultra capacitors may be used in this application) thereby permitting control of power delivered or extracted in regenerative mode of the motor. This arrangement of the sequence of oscillators provide a mechanism for energy storage, deployment and retrieval in the sort term particularly useful in vehicle drive applications. The oscillators can be designed to deliver sinusoidal waveforms or even what may approach square wave forms to maximize the torque generation of each phase. The background art has extensive material related to the use of controllers and sensors for control of moving magnet rotor motors, in the design of phase lagged systems of oscillators and power control of electrical machines by changing the power angle and frequency control of electrical oscillators. Notably the torque generation of the motor may accelerate the motor that in turn will require a higher frequency of oscillator output. To continue torque generation.

Yet another embodiment has separate load bearing axial bearings for the wheel from the bearings of the motor, while the wheel and motor are coupled to convey torque along the periphery of the motor, thereby minimizing the radial compression of the motor due to loads that the vehicle bears and which are transmitted through the wheel bearings. This will improve the performance of the tapered design for the motor elements as noted above by minimizing the change in axial gap with physical loads on the vehicle and its wheels.

Special arrangements need to be made in this and other architectures if there is a load supporting function for the present invention as in the use in a wheel structure for a vehicle. Load bearing functions as in wheels particularly on uneven surfaces, will cause relative compression of the rotor relative to the stator in the region below the machine, if there is a rigid connection between the wheel and the motor. Furthermore the unsprung mass of the wheel can be substantial if the motor is rigidly connected to the wheel. An alternative architecture in the present invention will be to have the load bearing bearings of the wheel separate to those of the motor itself and the motor shell attached flexibly to the wheel periphery to transfer torque. This may be done with tangential leaf springs that around the periphery mounted at one end to the wheel and at the other end to the motor housing on its periphery and thereby indirectly attached to the rotor. In this arrangement for forward motion the leaf springs will be in tension. These leaf springs may be designed to accommodate a compressive load for reverse motion of the vehicle. Alternatively, a second set of leaf springs may be used to be in tension when the vehicle is reversing and in compression in the forward direction. This second set of leaf springs may also be mounted at one end to have limited sliding capability so that when the vehicle is moving forward, these springs are not in compression but slide at the end coupling, but slide back to accept the tensile load when the vehicle is in reverse. This limited sliding arrangement may also be done for the first set of leaf springs to avoid compression when the vehicle is in reverse.

Another approach for the torque conversion in this architecture is to have key and slot arrangements along the periphery between the wheel and the motor. Compression of the wheel at any point on its periphery can be accommodated by the key sliding further into the slot. Torque will be transferred by the keys. The arrangement may have the slots on the wheel and the keys on the motor housing or with the slots on the motor and the keys on the wheel.

This new architectural feature may be taken further to have internal shock absorption for the wheel with flexible elements between the wheel bearing and the wheel periphery, thereby protecting the motor from excessive shock in this application as a wheel motor and reducing further the unsprung mass of the wheel. For example heavy leaf springs can be mounted tangentially between the periphery of the wheel and the central part of the wheel that is connected to the bearing, these leaf springs will accommodate some deflection of the wheel periphery relative to the bearing. In some embodiments of such internal shock absorption for wheels magnetic bearings may be employed.

Another aspect of the present invention is that cooling of the machine can be achieved with one or more of the following means:
1. In applications where the motor operates in dusty conditions or in water, the motor may be cooled with air pumped through an axial hole in the axle of the motor through ports in the stator between the rotor sections and forced out of the ports in the rotor. The pressure difference can be designed to ensure that there is no water or dust entering the motor.
2. In less severe conditions the motor casing can have fins very much like brake fins ion car wheels that scoop air into the motor through ports in the outer rotor disks each of the rotors and the stator disks inside the machine.
3. Yet another approach is to use bimetallic conductor strips in each of the loops of ribbons that are proposed in the windings such that a part of the loop is of one metal and the remaining part of that loop is of the other metal, thereby forcing a cool junction at the periphery of the motor. The hot end can be designed to the axle, which can be designed to be a heat sink to conduct heat to outside the motor. This arrangement can be combined with that described earlier with the rotor magnets with the inclined radial air gaps between the sector magnets, scooping air from the axial gap on one side of the rotor and depositing it on the other side and forcing a pressure differential that drives the air over the periphery of the stator which is cooled using the cold junction. The air may be returned along sealed paths or inducted and discharged to the atmosphere on the sides of the motor. If inducted and discharged into the atmosphere it will benefit additionally from the lower ambient air temperature. The hot junction will be at the axis, and the axle may be designed to be a heat sink to conduct heat out of the motor. In these embodiments that use the bimetallic stators for cooling there will of course be a direct current superimposed on the reversing currents (if required) to provide the cooling effect. The bimetallic winding arrangement may also be constructed to have the cold junctions and hot junctions in different locations, but such arrangements need to have heat sink arrangements near the hot junctions and locate the cold junctions where the magnets are cooled directly by convection through the air gap or cooled by an air flow that is forced around the cold junction. For example some embodiments may have the cold junction at the axis of the stator and fins at the periphery of the rotor to cool the outer edge of the air gap where the hot junction is located. Air can be forced through ports in the rotor bearings if such bearings are located between the stator sections.

By using the foregoing techniques, an electric machine can be fabricated with improved efficiency and results in an electric machine having improved operating characteristics.

Considering that in an application of the present invention in a vehicle wheel, ease of removal of the wheel and the motor are key benefits, the present invention proposes a central attachment along the non rotating axle for attachment with a central bolt that secures the wheel to the axle. The fit of the axle with the wheel socket for this purpose, may be tapered to allow the tension in the bolt to increase the reaction force between the socket and the axle surface. Moreover, to transfer torque the socket and the axle contact surfaces may be splined or keyed.

Furthermore this possible assembly aspect of the present invention may be further refined to have the wheel in two sections—the iner section that is on one side of the motor on the axle and outer section that is on the other side of the motor on the axle. Removal of the wheel without removal of the motor may be facilitated by removal of the external section only with the tire. The two sections of the wheel may be held together under operating conditions by bolts or other fasteners or simply key into each other when the rim and tire with the external section are installed to the axle. This keying arrangement may also be between the wheel rim attachments and the inner section.

Preferred Embodiment

The following is a detailed description of some of the components of the preferred embodiment of the present invention.

The axial gap machine in the preferred embodiment has a plurality of disk-like magnet assemblies that constitute the rotor of the machine, that are installed to the outer body of the machine. The outer body in turn completes the magnetic circuit for the magnet assemblies, which provide the means for air gaps with axial magnetic fields. Moreover, one or more of these rotor magnet assembly disks may be supported with bearings on the axis to which the stator is fixed resulting in the assembled rotor resting on the central axle on a plurality of bearings that are mounted at the radially inner edge of two or more of the said magnet assemblies that interleave the stator disks. Such an arrangement may be constructed from separate disk assemblies of magnets as in rotors of axial field machines—well disclosed in the background art, that are attached together leaving adequate space between them for the required axial air gaps and a stator in each intervening space between adjoining rotor magnet assemblies.

The stator is composed of one or more disks that are each composed of windings that are fixed to the central axis of the machine. Each of these disks is interspersed with the rotor disks as described above. The said axis also provides the support for a wheel in a vehicle or gear or pulley arrangements in machines.

According to another feature of the invention, coils for an electric machine may be fabricated by conventional windings and cores or the following means.

Windings are composed of elements constructed in sectors of a torroid or annular ring that interlock as follows: Each of the conductors are shaped to form a loop with open ends at the inner circumferential edge of the torroidal or annular shape that is described. The cross section of the conductor is of a ribbon with width much greater than the thickness to minimize the Hall effect on the conductors. Magnetic core material of small cross section and in elements of length equal to the width of the ribbon may be attached to the conduction ribbon on one or both sides with insulating film. The conducting ribbon is of course insulated. The ribbon shaped conductor may be formed in many ways. One of the approaches is as follows: The ribbon shaped conductor is formed into a loop first without twisting the ribbon (0 degrees twist). The loop is further formed by straightening two diametrically opposed edges to form the two radial sections at a predetermined angle to each other that define the sector of the torroid or annular ring about the axis of the machine that a single loop of the winding will cover. However, one of these two radial sections of ribbon are twisted by 180 degrees about an axis along its length, and maintains this angular orientation along its entire length of that radial section. This results in the corresponding wide surface of the ribbon on both radial sections facing the same direction. This twist in the ribbon results in the twist being entirely generated through 180 degrees at the circumferential sections of the loop. Finally the two radial sections are placed so that they are radii of adjoining cylinders about the same axis. Stated another way, the circles of rotation of the two radial sections of the ribbon develop two cylinders that are co axial and adjoining each other but do not intersect each other. This construction of the loop allows a series of such loops to interlock with each other to form a complete torroid or annular ring without any gaps. Moreover, if the magnetic material is bonded to the ribbon this will form a distributed core as well. With this construction of interlocking ribbons, the cross section of the torroid or annular ring has two ribbon shaped conductors edge-to-edge one each from the loops on either side of the torroid or annular ring. Each of the independent loops has terminals or simply flanges at each end of the ribbon loop positioned preferably on the inner circumferential section. Such flanges may be connected in series or parallel to each of the phases of the power circuits, to meet the particular winding need. Such connections may be made with pins that connect selected flanges. Notably, such a winding can be universal except for the sector angle that is described by the loops, in that the individual loops can be connected to any number of phases and turns per winding. A further improvement would be to use conductors of widening section on the radial sections to maximize the conductor crossection in each loop. The ribbon may alternatively be twisted by 360 degrees from end to end of the loop (instead of a net 0 degrees) by twisting each of the circumferential sections by 180 degrees in the same direction (rather than in opposite directions for the 0 degrees net). In either of these arrangements, the optimal utilization of the stator winding volume is achieved by adjusting the thickness of the conductors in relation to the thickness of the ferromagnetic material to maximize the flux linkage to the rotor by lowering the reluctance with more ferromagnetic core material while maximizing the conductor thickness and the current density. The conductor ribbons may be stranded and or braided wire to be more flexible in this arrangement. In some embodiments the entire back shaped as an annular flat disk between the two sections of conductors provides additional rigidity to the windings but is not physically connected to the axle. The entire load is transferred through the material of the windings to the axle. The back iron may be radially serrated to accommodate the edges of the windings and bonded together by methods well disclosed in the background art. Moreover, if the stator windings are predefined at the time of assembly and the physical angle of each phase winding is known in advance, the back iron may have raised sections that index the windings between these sections of the ribbon windings to transfer torque during operation. In addition the ribbon conductors may be shaped to index the sides of the back iron disk. In other embodiments several groups of adjacent radial sections of the ribbon windings are selected in symmetric positions around the stator, and each of the radial ribbon sections in these groups are fabricated to have broader cross sections in the radial (or working) sections of the ribbons thereby creating a set of splines—one for each group, that face the back iron, and that may interlock with splines in the back iron to transfer torque.

The above winding arrangements utilize the entire space in the torroid or annular ring with either conductors or magnetic core material. Furthermore it is possible to "grind" the windings or ribbons along with the distributed core to have any desired cross section for the stator thereby optimizing the air gap that may follow a non-linear rotor cross section as in some special rotor configurations noted in this invention.

This embodiment has rotor disks with magnets that are tapered to be narrower at the center and broader and the periphery where they are attached to the body of the rotating shell, and wherein the stator disks are tapered to be broader at the base at the axis and narrower towards the edge of the disks. Thereby the geometry will ensure that of the taper rates are the same for stator and the rotor, the air gap will remain the same radially across the machine for all the disks. Moreover, as the greatest torsional forces on the stator are near the axis and the greatest torsional forces on the rotor are near the periphery, this geometry can optimize material usage to minimize weight of the machine for the required strength characteristics.

An additional feature of the present invention with the above tapered rotor design can be utilized to optimize the air gap for different speeds for operation. A small air gap is desired in the machine at low speeds to maximize the torque generated by the machine. However as the machine builds speed, both back EMF and air resistance in the air gap will limit the speed of the machine significantly. The tapered design in the present invention can be adapted to automatically increase the air gap at high speed. This can be a smooth gradual process that matches the gap for the speed of performance. This is achieved by moving the sections of the rotor radially outwards by a very small amount. Notably, by having different gradients of taper of the sides of the rotor radially, the rate of change of the air gap can be different for different radial distances from the axis. For example, as the relative linear velocity between the stator and the rotor at the periphery of the motor rises more rapidly as the motor accelerates, a greater increase in air gap could be beneficial at the periphery. This can be achieved by having a steeper taper at the periphery of the motor (rotor and stator) and a more gradual taper towards the center of the motor. The exact tapers can be designed using computer simulations of the effect of back EMF and turbulent flow in the air gap. This movement may be achieved with centrifugal force on the rotor sections and special fabrication of the radial magnet sections (and brackets if used) of the rotor and the intervening mechanical connectors that may be spring loaded to permit slight expansion circumferentially and a special construction of the rotor with the bearings on the axle to permit a slight extension radially. Such an arrangement can "stretch" the outer supporting ring of the rotor under centrifugal force to increase the air gap with the above tapered design. The outer supporting ring can have spring-loaded telescoping sections between the magnet supports that allow this increase in diameter under centrifugal force. The magnets (with radial support brackets if used) may be connected rigidly at the outer periphery but slidably at the inner end to a ring support that may be attached to a bearing that support the magnet assembly particularly with regard to axial movement.

Yet another approach for changing the air gap is to utilize the torque generated in the machine to stretch elements of the rotor. For example if the sectors of the rotor are constructed as radial sections (for example for each pole section separated physically) and supported pivotally at the center and the external periphery by two annular rings or other support (the inner supports must allow some movement as well: such as with an elongated slotted pivot), such that when the sections are perfectly radial there is a larger gap between the radial elements (not the working air gap between the rotor and stator). A twisting of the inner annular ring about its axis, forces the "radial" magnet sections to move at a slight angle to the radial but increases the radial distance at each point on the magnet from the axis by moving the slotted pivots slightly in their respective slots. Under low load and no-load conditions the sectors of magnets are designed to be at a small angle to the radial direction thereby increasing the working air gap as a result of the tapered construction of the rotor and stators. However, under high load conditions the torque generated by the motor will drive the magnet sectors to a perfectly radial position thereby reducing the working air gap and increasing the power delivered by the machine and the torque generated against the load. The mounting arrangement will of course have to be spring mounted to resist these changes at low torque but allow this distortion at high torque. There should also be an end stop device to prevent the rotor sections from moving past the radial position to incline from the radial in the opposite direction to the no-load position under extreme load and thereby reducing the ability of the machine to provide adequate torque as a result of the increase of the working air gap.

Another feature of this embodiment utilizes the fact that the magnets need to be supported to resist a tangential torque and an outward radial centrifugal force while in operation. As the rotor is supported in these embodiments by the motor body structure, the magnets in sectors may be fixed on the outer arc edge and radial air gaps (between radial sectors of magnets as distinct from the required axial air gap for operation) permitted between adjoining magnets with only minimal support with spacers or minimal brackets to support the magnets to equalize torque between the magnets and reduce vibration. These radial air gaps contribute to the cooling of the magnets—a particularly important factor in axial gap machines. The cooling can be further improved by inclining the magnet faces between the magnets to be at a small angle to the axial direction so that the gaps scoop air from one side of the rotor and deposit it at the other side of the rotor. The Air return path could be at the periphery of the motor where cooling devices may be harnessed to lower the temperature of the air. The Air that is forced through the motor may be retuned to the other side of the motor after cooling in tubes on the periphery of the motor or inducted on one side of the motor and discharged on the other side of the motor. The latter arrangement will benefit more from a low ambient temperature but suffer from the disadvantage of impurities in the air that may damage or impair the motor operation. Some embodiments for such cooling follow in the present invention. Notably the stator windings in adjoining sections along the axis will need to be skewed to ensure that the faces of the magnet line up with the rotor windings on both sides for the rotor (in the event of stator windings being present on both sides for the rotor magnet). Still other embodiments have the radial sections of the magnets subdivided into smaller radial sections and interspersed with insulation thin film and pinned together to form each of the magnets that comprise the set of magnets around the perimeter of the rotor. This construction will reduce the Hall effect heating and power loss in the magnet assemblies.

Yet another feature of this invention is the use of a number of oscillators that are each phase lagged to one another, the set of said oscillators together forming a complete 360 degree phase shift and may be driven off a controller (for example a hall effect controller) that identifies the position of the rotor for synchronizing the set of oscillators. These oscillators are connected to each of the phases of the motor (or generator) The power angle, and frequency are controllable with large capacitors (ultra capacitors may be used in this application) thereby permitting control of power delivered or extracted in regenerative mode of the motor. This arrangement of the sequence of oscillators provides a mechanism for energy storage, deployment and retrieval in the short term particularly useful in vehicle drive applications. The oscillators can be designed to deliver sinusoidal waveforms or even what may approach square waveforms to maximize the torque generation of each phase. The background art has extensive material related to the use of controllers and sensors for control of moving magnet rotor motors, in the design of phase lagged systems of oscillators and power control of electrical machines by changing the power angle and frequency control of electrical oscillators. Notably the torque generation of the motor may accelerate the motor that in turn will require a higher frequency of oscillator output, to continue torque generation.

Yet another feature of the present invention has separate load bearing axial bearings for the wheel from the bearings of the motor, while the wheel and motor are coupled to convey torque along the periphery of the motor, thereby minimizing the radial compression of the motor due to loads that the vehicle bears and which are transmitted through the wheel bearings. This will improve the performance of the tapered design for the motor elements as noted above by minimizing the change in axial gap with physical loads on the vehicle and its wheels.

Special arrangements need to be made in this and other architectures if there is a load supporting function for the present invention as in the use in a wheel structure for a vehicle. Load bearing functions as in wheels particularly on uneven surfaces, will cause relative compression of the rotor relative to the stator in the region below the machine, if there is a rigid connection between the wheel and the motor. Furthermore the unsprung mass of the wheel can be substantial if the motor is rigidly connected to the wheel. An alternative architecture proposed in the present invention will be to have the load bearing bearings of the wheel separate to those of the motor itself and the motor shell attached flexibly to the wheel periphery to transfer torque. This may be done with tangential leaf springs that around the periphery mounted at one end to the wheel and at the other end to the motor housing on its periphery and thereby indirectly attached to the rotor. In this arrangement for forward motion the leaf springs will be in tension. These leaf springs may be designed to accommodate a compressive load for reverse motion of ht e vehicle. Alternatively, a second set of leaf springs may be used to be in tension when the vehicle is reversing and in compression in the forward direction. This second set of leaf springs may also be mounted at one end to have limited sliding capability so that when the vehicle is moving forward, these springs are not in compression but slide at the end coupling, but slide back to accept the tensile load when the vehicle is in reverse. This limited sliding arrangement may also be done for the first set of leaf springs to avoid compression when the vehicle is in reverse.

Another approach for the torque conversion in this architecture is to have key and slot arrangements along the periphery between the wheel and the motor. Compression of the wheel at any point on its periphery can be accommodated by the key sliding further into the slot. The keys will transfer torque. The arrangement may have the slots on the wheel and the keys on the motor housing or with the slots on the motor and the keys on the wheel.

This new architectural feature may be taken further to have internal shock absorption for the wheel with flexible elements between the wheel bearing and the wheel periphery, thereby protecting the motor from excessive shock in this application as a wheel motor and reducing further the unsprung mass of the wheel. For example heavy leaf springs can be mounted tangentially between the periphery of the wheel and the central part of the wheel that is connected to the bearing, these leaf springs will accommodate some deflection of the wheel periphery relative to the bearing. In some embodiments of such internal shock absorption for wheels magnetic bearings may be employed.

Another aspect of the present invention is that cooling of the machine can be achieved with one or more of the following means:

1. In applications where the motor operates in dusty conditions or in water, the motor may be cooled with air pumped through an axial hole in the axle of the motor through ports in the stator between the rotor sections and forced out of the ports in the rotor. The pressure difference can be designed to ensure that there is no water or dust entering the motor.
2. In less severe conditions the motor casing can have fins very much like brake fins ion car wheels that scoop air into the motor through ports in the outer rotor disks each of the rotors and the stator disks inside the machine.
3. Yet another approach is to use bimetallic conductor strips in each of the loops of ribbons that are proposed in the windings such that a part of the loop is of one metal and the remaining part of that loop is of the other metal, thereby forcing a cool junction at the periphery of the motor. The hot end can be designed to the axle, which can be designed to be a heat sink to conduct heat to outside the motor. Such heat dissipation at the axle may be improved with water or other coolant circulation through the axle using techniques well disclosed in the background art. This arrangement can be combined with that described earlier with the rotor magnets with the inclined radial air gaps between the sector magnets, scooping air from the axial gap on one side of the rotor and depositing it on the other side and forcing a pressure differential that drives the air over the periphery of the stator which is cooled using the cold junction. The air may be returned along sealed paths or inducted and discharged to the atmosphere on the sides of the motor. If inducted and discharged into the atmosphere it will benefit additionally from the lower ambient air temperature. The hot junction will be at the axis, and the axle may be designed to be a heat sink to conduct heat out of the motor. In these embodiments that use the bimetallic stators for cooling there will of course be a direct current superimposed on the reversing currents (if required) to provide the cooling effect. The bimetallic winding arrangement may also be constructed to have the cold junctions and hot junctions in different locations, but such arrangements need to have heat sink arrangements near the hot junctions and locate the cold junctions where the magnets are cooled directly by convection through the air gap or cooled by an air flow that is forced around the cold junction. For example some embodiments may have the cold junction at the axis of the stator and fins at the periphery of the rotor to cool the outer edge of the air gap where the hot junction is located. Air can be forced through ports in the stator near the axle. And continue through the gaps between the magnet assembles to cool the magnets. Returns paths or induction and exhaust routes for the cooling air may be used as noted for the above designs. Gases other than air may be used to increate thermal capacity for heat removal from the magnet structure.

By using the foregoing techniques, an electric machine can be fabricated with improved efficiency and results in an electric machine having improved operating characteristics.

Considering that in an application of the present invention in a vehicle wheel, ease of removal of the wheel and the motor are key benefits, the present invention proposes a central attachment along the non-rotating axle for attachment with a central bolt that secures the wheel to the axle. The fit of the axle with the wheel socket for this purpose may be tapered to allow the tension in the bolt to increase the reaction force between the socket and the axle surface. Moreover, to transfer torque the socket and the axle contact surfaces may be splined or keyed.

Furthermore this possible assembly aspect of the present invention may be further refined to have the wheel in two sections—the inner section that is on one side of the motor on the axle and outer section that is on the other side of the motor on the axle. Removal of the wheel without removal of the motor may be facilitated by removal of the external section only with the tire. The two sections of the wheel may be held together under operating conditions by bolts or other fasteners or simply key into each other when the rim and tire with the external section are installed to the axle. This keying arrangement may also be between the wheel rim attachments and the inner section.

An embodiment of the present invention in a wheel is illustrated in FIGS. 18 and 19. Here the rotor is the motor housing and is coupled with the inside of the wheel using flexible flanges as described elsewhere in this invention. Such flanges may be spring loaded under tension. The weight of the wheel is supported by the axle that engages a bearing housing within the axle of the motor stator. There is in some embodiments a gap between the axle bearing housing (fixedly attached to the wheel) and the stator of the motor. This construction with the shock-absorbing device between the wheel axle support 134 and the stator axle support 133, allows a decoupling of the wheel from the wheel motor. The torque is conveyed on the outer side of the motor or the rotor through the coupling flanges. There is a similar gap designed between the motor rotor (motor housing) and the inside surface of the wheel to allow the controlled movement and decoupling in the event of radial accelerations of the wheel in a vertical direction. Overall this arrangement allows the wheel axle to move in a controlled fashion relative to the motor rotor in a direction perpendicular to the axes of the motor and the wheel suitable for shock absorption for the wheel with limited perturbation of the motor. Notably the larger the diameter of the outer surface of the rotor of the motor and the diameter of the inner surface of the wheel, the greater the effectiveness of the torque transmission flanges described, as a radial movement of the wheel relative to the motor axis will not incline the flanges significantly from their substantially tangential orientation to the inner surface of the wheel and the outer surface of the motor rotor. The wheel assembly including the motor support is supported in this embodiment by the stator mount and shock absorber housing 133 to the vehicle frame through the required shock absorbers and steering mechanisms. The stiffness and damping characteristics of the shock absorber supporting the entire wheel assembly and the stiffness and damping parameters of the wheel shock absorber will together determine the effective mass of the wheel.

Yet another variation of the embodiment of the motor driving a wheel is illustrated in FIGS. 18A and 19A. Here the wheel is directly supported on its axle with the appropriate shock absorption devices as amply disclosed in the background art. The motor is supported by the axle of the wheel with the shock absorbers 133, 135 now designed to absorb shock to the inertial mass of the motor and its supports relative to the wheel axle.

Alternative Embodiments

In an alternative embodiment to the preferred embodiment, the stator winding construction uses stampings that form the entire circle of rotation of the motor. Apertures are stamped out for the magnetic core material that also forms support and each leg of the winding has configuration to provide the required flux generation to the core elements. The stampings are interleaved with thin insulating sheets, and may be displaced by a desired angle from the preceding stamping. To complete the winding design, pins may be inserted through the stack of stampings. Those stamping layers that need to be connected to each other will have a tight fit with two or more pins. Those that belong to another set of windings or phases have a loose fit to the pin in that location thereby not allowing electrical contact, but having other locations where the pins have a tight fit to form the required electrical contact. Notably the holes that match up with the pins may be stamped out as well and are designed to be narrow for the pins that need to be connected for the relevant stamping and wide for the pins that should not be connected to the relevant stamping. This design can be used for a wide variety of winding designs. Finally in these embodiments conductor thickness can be increased by utilizing space in the plane of stampings that do not have conductors in a particular winding radial section, by building up the adjoining stamping that does have a conductor in that particular winding section or radial section.

Another alternative embodiment of the windings using the torroidal structure with ribbon conductors can use braided or stranded material for the conductor. Yet another embodiment of the toroidal structure of the windings will have sheet metal stamped and bent into the required shape of each turn of the windings. These can be stamped to have flanges for connecting pins as well on the outer or inner periphery as well.

In yet other embodiments, the ribbon conductors may be either slotted on the inside arc sections or bent around (at the sections of the ribbon that is twisted, at a point where the width is parallel to the radius) to accommodate radial support elements of the back iron linked to the axle, that may lie between the concentric cylinders formed by the windings as noted above.

Yet another embodiment will have the ribbon conductors packed with powder metal and compacted with dynamic magnetic compaction or other techniques available in the background art. This will improve the efficiency of utilization of space between conductors for a lower reluctance magnetic path. This is particularly useful if a constant thickness conductor is used and there is a greater gap between adjoining conductors towards the outer end of the working conductors. Yet another feature of this invention is an embodiment that has the radial sections of each ribbon conductor preformed and attached to a (insulating) membrane bag of the same shape as a side of each of the radial sections of the conductor, containing powder metal in a predetermined quantity. At the time of assembly of the coil, the powder metal will be redistributed in the thin membrane bags to take up all the available space between the conductors—more towards the outer ends of the radii. The assembly may then be compacted as noted above. Following the assembly of the windings as follows, the surface of the winding with the attached core material may be ground or machined to expose the surface of the ribbon conductor from the surrounding core material so that a magnetic gap is established to minimize magnetic leakage in the machine.

Several alternative embodiments of this invention are possible with the windings in the current invention using topologically equivalent conductor shapes. For example individual ribbon loops may be constructed to have two flanges near the axial edge of the working conductors on each of the legs of the loop, so that in the winding position these flanges of adjoining loops form a ring around the axis of the machine that can be used for support and also heat dissipation if they engage fixed elements of the axle. Moreover, such flanged may be arranged to be of varying lengths such that when assembled as a winding they form a splined profile that will better transfer torque to the axle which may have support flanges appropriately splined. Another application in using topologically equivalent conductors to flat ribbon conductor loops is to fold the conductor at the non-working ends to reduce the edge length on one side and not the other so as to allow easier assembly of the loops in the stator torroid. Yet another topologically equivalent form is to have an "O" shaped flat ribbon conductor (that may be stamped out) with straight sides that correspond with the length of the working conductors of the loop and straight conductors of the length of the non-working peripheral and axial conductors respectively. The closed form needs to be cut and separated at a point on the inner non-working conductor section to connect with adjoining loops. Sections of the Non-working conductors can then be bent to be perpendicular to the working conductors to permit the loop and winding configuration of the twisted conductor torroid construction noted in this invention with one notable difference—The torroid generated by these open loops that form the windings may not have an axis perpendicular to the width of the conductor but be at an angle thereby compromising he eddy current loss characteristics and the air gap.

Yet another embodiment uses the toroidal coil arrangement as described but with the permanent magnet rotor fixed to the axle and the stator attached to the housing of the machine.

Yet another embodiment uses the torroidal coil arrangement as described but with the permanent magnet rotor fixed to the axle and the stator attached to the housing of the machine.

Yet another alternative embodiment of the windings in the torroidal structure above has wound coils shaped into rectangular sections (it will no longer be necessary to minimize the Hall effect of the conductors and therefore the thickness of the coils can be comparable to the width of the coil. Each of the coils would then interlock to form a torroid or annular ring. Each radial limb of the coil may have magnetic material attached to it to form a distributed magnetic core.

Figure 2V:
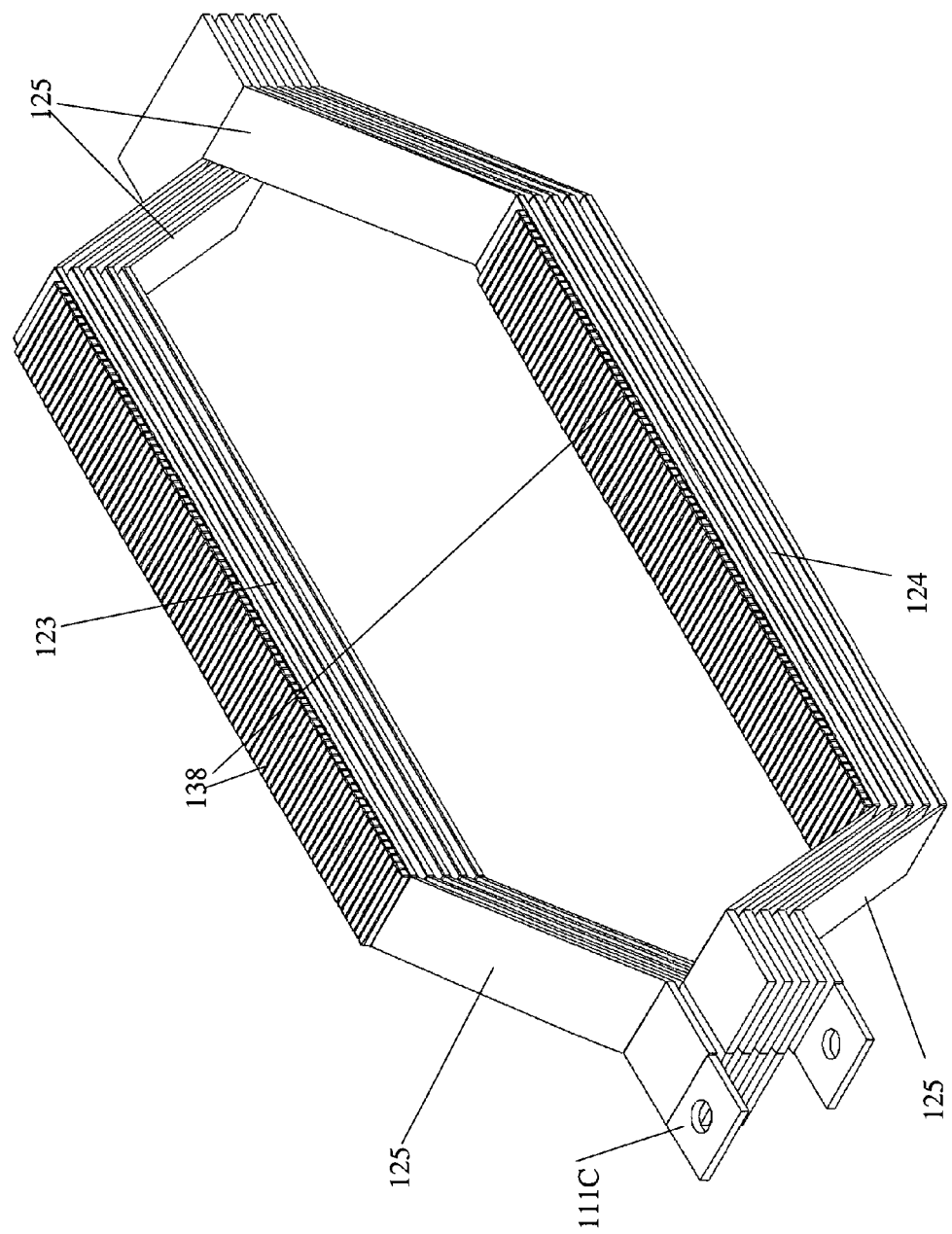

Yet another alternative embodiment for the windings as illustrated in FIG. 2U has a strip conductor forming the windings. This figure shows a complete winding with connectors 111C. FIG. 2V shows the winding as in the embodiment of FIG. 2U with a magnetic core material attached to the winding. The core material may have an increasing thickness towards the radially outward end of the winding to accommodate the required curvature of the assembled windings of the machine. However, in the case of machines with an infinite radius of curvature as in a linear electrical machine such variation in thickness may not be useful.

FIG. 2W illustrates this embodiment of the invention with a winding as is FIG. 2V with a loop support 140 attached to one side for bracing the winding and attachments to either or both of the edges (radially inside or outside) of the wound element following assembly of the windings into a torroid (Infinite radius in the case of a linear motor). The form of 140 may have only the inner or outer support flanges if both are not required. Moreover the cross section of this element can be increased radially to accommodate the curvature of the Taurus generated by the assembled windings of the electrical machine. This will facilitate smaller required accommodation in length differences between inside and outside conductors of windings and even allow rectangular windings in some cases for rotational machines. Linear machines with an infinite radius of curvature may not require such changes in the cross section to accommodate curvature.

In applications of any windings in this invention linear machines (with infinite radius of curvature) there will of course be no need for a variation of the cross sections with rectangular windings.

FIG. 2X show a Wave winding embodiment (shown in linear form for clarity) with the strip embodiment as in FIG. 2U. In the case of a finite radius machine, (rotary machine) the top layer in the bottom leg of the winding attaches to the top layer on the top leg after follow the circle of rotation and thereby completes the path to become the second layer after the top connector 111C on the left of the diagram. There onwards it goes through additional circles of rotation of the machine windings and ends up as the connector on 111C on the right at the bottom of the winding. Many such individual windings are stacked together to form the assembled windings of the machine.

FIG. 2Y illustrates the embodiment of 2X with the loop support 140 to support the windings and provide attachment means for the assembled torroid on either or both of the inner perimeter or the outer perimeter. The form of 140 may have only the inner or outer support flanges if both are not required. Again in the case of the infinite radius of curvature linear machine there may not be a need for a variation in the thickness of the support 140 but could be useful in the finite radius of curvature machines. In either case the support 140 may be attached to support members for the winding assembly either on the axle or the housing after the individual windings have been assembled to form the Taurus or linear windings as the case may be. FIG. 2Y1 illustrates the loop support for the case of the Wave winding on its own. FIG. 2Y2 illustrates the loop support for the Lap winding on its own. Notably the flanges at either end may be sized for the required support at that end. In many embodiments there may not be a need for support at the radially inward end and radially outward end and therefore a single flange may suffice.

FIG. 2Z1 illustrates a method for fabrication of the windings in FIG. 2U–2Y. The strip conductor is folded on itself and then again folded on itself to rotate about 180 degrees. It can then be bent to form either a Lap or a Wave winding. The illustration shows one folded end. The other ends will be bent out ward (as illustrated) for the Wave winding or bent inwards for the Lap winding and the same folding as in 125A performed at the other edge. This allows the fabrication of the entire winding with a single ribbon of width "w" as noted herein.

FIG. 2Z2 illustrates another embodiment and a method of the strip used in FIGS. 2U–2Y. With FIG. 2Z3 illustrating the flat strip that is bent to form the illustrated Wave winding in 2Z2 or the equivalent lap winding. The adjoining winding turns are attached to each of the 125B2 flanges at the seam 125 B1. Each of the seams 125B2 at 125B1 will be attached to adjoining turns of the winding and thereby form a winding section as shown in FIG. 2Z2A and FIG. 2Z2B. Attachment can used several methods in the background art including seam welding techniques.

In any of the embodiments noted each of the individual windings are assembled by stacking the turns on one another. If uninsulated conductor strip is used, insulator strips of width at least "w" can be interspersed with the conductors. In such embodiments where uninsulated conductors are used however, caution needs to be exercised in ensuring that there is a gap between the two legs of the windings that form each of the two tauruses. This will prevent short circuiting in for example the sections 125B3 and 125B4 where adjoining windings cross each other. Moreover this will allow introduction of insulating material between the legs to avoid short circuiting of windings. Embodiments can of course use insulated conductors as the windings are formed and additional insulation and binding materials such as epoxy introduced to support the windings when assembled. As noted herein the assembly may also have magnetic core material introduced between the individual windings and have a variable cross section to accommodate the curvature of the machine. Finally the support "Loop" may also be attached as the windings are assembled.

Yet another embodiment can use differential expansion of the rotor with regard to the stator to increase the air gap at higher temperatures with the tapered design in the present invention. Each of the magnet structures that are positioned radially are connected together circumferentially and to the hub in the center by materials that have a high coefficient of expansion with heat in addition to their required load bearing properties required in this application. As the temperature of the machine rises the expansion on the rotor of the connecting elements between the magnets and the connecting elements to the hub(s) is designed to exceed that of the expansion of the stator and as result of the tapered construction will cause an increase in the gap of the machine.

Yet another embodiment has "radial" air gaps between the magnet structures in the magnet assembly of the rotor, constructed to have a slight angle to the radial direction and said gap having a small angle to the axial direction on each side facing a working air gap, thereby providing a mechanism to scoop air out from the working air gaps and discharge the hot air though ports at the periphery of the machine. The airflow can also be reversed in a similar embodiment where air is scooped up through ports on the periphery of the machine and pumped out to the working air gap. Such air can be exhausted through ports in the axle or at the periphery of machine between the magnet assemblies.

Yet another embodiment of this invention has a magnet rotor attached to the axle with the stator attached to the housing and comprising windings with a higher coefficient of expansion than the magnet assemblies, thereby increasing the air gap with the tapered rotor/stator arrangement.

Another alternative embodiment has the rotor of a multi-rotor machine with interspersed stators, entirely supported by the housing of the motor and its bearings on the sides of the motor, and without bearings at the axle between stators for the rotors, thereby reducing cost and weight of the machine.

Yet another embodiment of the present invention has the stator on the outside with the windings and the rotor attached to the rotating axle. Said embodiment having the rotor and stator designed with a tapered construction as discussed elsewhere in this invention.

Another alternative embodiment of the wheel drive for the present invention uses a fluid or gel between the outer surface of the rotor and the inner surface of the wheel. Notably a radial movement of the wheel relative to the motor does not change the overall volume in the gap between the inner surface of the wheel and the outer surface of the motor rotor. Both the inner surface of the wheel and the outer surface of the motor may have vanes to propagate the fluid or gel within the gap. Such vanes will need to be short enough to ensure that radial movement of the wheel axis relative to the motor axis does not let the vanes touch the opposite surface within the gap between the outer surface of the motor and the inner surface of the wheel. Such a fluid or el may be retained using techniques available in the background art.

CONCLUSIONS, RAMIFICATIONS & SCOPE

Thus it will become apparent that the present invention presented, provides a new paradigm for the design of electrical machines for the use in wheel motors and other applications where high torque and low mass are required. The present invention presents embodiments that make these applications achievable with a unique machine structure, fabrication techniques and thermal, electric and magnetic performance management.

The invention claimed is:

1. A method for constructing a winding with at least one turn in an electrical machine with a contiguous conductor with local relative motion in the x-direetion of a 3 dimensional space with x-, y-, and z-directions between
   a magnetic field element (102/103 FIG. 1, FIG. 9) with a plurality of pairs of poles, each pair of poles arranged to provide a magnetic field between a first member and a second member of said pairs of poles substantially in a y-direction orthogonal to said relative motion of said electrical machine, and wherein said plurality of pairs of poles are arranged to be along the local direction of motion of said electrical machine,
   and wherein the first members of the pairs of poles comprise the first set of poles and the second members of the of the pairs of poles comprise the second set of poles;
   and said winding with at least one turn (101 FIG. 1, FIG. 2A, FIG. 2B, FIG. 2J, 2K, 2K1, 2P, 2Q, 2U, 2X, 2Z1, 2Z2, 2Z2A, 2Z2B, 10A, 10B, 13A1, 13A2, 13B) by:
   constructing a contiguous flat conductor with a first end and a second end (111c), wherein the contiguous conductor has a length, and a width "w" and a thickness "t" at each point along said length, and wherein the width is greater than the thickness at each point along said length, and said contiguous conductor having a first and second face across said thickness along said length of said conductor,
   orienting said contiguous flat conductor such that it comprises at least one pair of working segments each comprising a first working segment and a second working segment along its length by
      locating the first working segments adjoining the first set of poles at a distance of a first air gap (139), and
      locating the second working segments adjoining the second set of poles at a distance of a second air gap (139),
      furthermore, locating the first and second working segments to be separated in the y-direction by a non-zero distance,
      orienting each of said working segments such that the width "w" of the continuous flat conductor along the length of said working segments lies substantially in the direction of said magnetic field in the y-direction (FIG. 2M, 2T, 10C, 13C),
      orienting the first face of each of said pair of working segments to face the local direction of motion of said working segment in the electrical machine,
      orienting the second face of each pair of working segments to face the direction opposite the local direction of motion of said working segment in the electrical machine,
   wherein the first face of each member of each pair of working segments is on the first face of the contiguous flat conductor and the second face of each element of each pair of working segments is on the second face of the contiguous flat conductor,
   orienting each segment of the contiguous flat conductor between any first working segment and the next second working segment along said contiguous flat conductor, comprising non-working segments, such that the first face of each non-working segment is contiguous with the first face of each of the first and second working segments contiguous with the non-working segment, and the second face of each non-working segment is contiguous with the second face of each of the first and second working segments contiguous with the non-working segment,
   wherein the first face of the non-working segment lies on the first face of the contiguous flat conductor and the second face of the non-working segment lies on the second face of the contiguous flat conductor,
   installing two connection means at the ends of the contiguous flat conductor,
   reducing the spacing between consecutive first working segments, between consecutive second working segments, consecutive non-working segments between first and second working segments ordered from the first end to the second end along the contiguous flat conductor, and consecutive working segments between second and first working segments ordered from the first end to the second end along the contiguous flat conductor,
   thereby forming one or more turns of a winding with the working and non-working segments packed together with the first face of the contiguous flat conductor on any segment always facing and adjacent to the second face of the contiguous flat conductor on another segment along substantially its entire length providing means for self bracing of adjacent surfaces of the winding, and all the first faces of working segments facing the local direction of motion of the windings and all the second faces of working segments facing in the direction opposite the direction of relative motion of the electrical machine.

2. A method for constructing a wound element of an electrical machine comprising the method of claim 1, for constructing multiple windings with at least one turn, further comprising:
   interlocking said multiple windings with at least one turn, with the first face of the contiguous flat conductors of each of the windings with at least one turn in the same direction (FIG. 2L, 2M, 2N, 2S, 2T, 10C, 13C).

3. A method for constructing a wound element of an electrical machine comprising the method of claim 2, further comprising:
   grinding the surface of the each of the stacks of working segments along the outer edge facing the air gap to a profile that matches the pole surface (FIG. 1).

4. A method for constructing a winding of an electrical machine comprising the method of claim 1, further comprising attaching on one or both of the first and second faces of one or more of the working segments of the contiguous flat conductor, insulated magnetic core elements (2K, 2R, 2V, 10C, 13D).

5. A method for constructing a winding of an electrical machine comprising the method of claim 4, wherein said magnetic core elements are of length substantially equal to the width "w" of the contiguous flat conductor and oriented across the width of the contiguous flat conductor.

6. A method for constructing a winding of an electrical machine comprising the method of claim 4, wherein said magnetic core elements comprise powdered magnetic core material compacted and bonded to said working conductor segments.

7. A method for constructing a braced winding of an electrical machine comprising the method of claim 1, further comprising:
   attaching a loop support (140: FIG. 2W, 2Y, 2Y1, 2Y2) on one of the exposed first or the second side of the contiguous flat conductor for at least one of additional support of the winding, attaching windings to a support on the side of one or the other non-working conductors.

8. A method for constructing a winding of an electrical machine comprising the method of claim 1, wherein said contiguous flat conductor has a substantially constant width "w", and comprises at each non-working conductor segment a folding arrangement on itself (FIG. 2Z1) whereby the direction of the conductor rotates by 180 degrees and shifts along its width by substantially a distance "w" thereby being adjacent to the section on the other side of the folding arrangement and the first face of the contiguous flat conductor on either end of the folding arrangement remaining on the same side of the conductor.

9. A method for constructing a winding of an electrical machine comprising the method of claim 1, wherein said contiguous flat conductor is constructed by:
   constructing strips of conductor material of width greater than 2×"w",
   splitting the conductor strips along their middle for all of their lengths except for an end section of approximately "w" thereby creating two parallel conductors of width "w" connected at one end with a section about "w" long (FIG. 2Z3) on each of the strips of conductor material forming a "U" with a first and a second leg,
   attaching each of ends of the first legs of the U to the ends of a second leg of the "U" of another strip of conductor material (FIG. 2Z3 125B1–2 sides),
   forming the winding by bending sections for working segments (123B, 124B: FIG. 2Z3, 2Z2A, 2Z2B) for angled sections of non-working segments (125B3, 125B4: FIG. 2Z3, 2Z2A, 2Z2B) and connection sections of non-working segments (125B6, 125B2: FIG. 2Z3, 2Z2A, 2Z2B) along with the connections to adjacent turns (125B1: FIG. 2Z3, 2Z2A, 2Z2B).

* * * * *